United States Patent [19]

Lau

[11] Patent Number: 5,323,473
[45] Date of Patent: Jun. 21, 1994

[54] METHOD AND APPARATUS FOR DETECTING THE LEADING AND TRAILING EDGES OF A DOCUMENT IN AN IMAGE BASED SYSTEM

[75] Inventor: Simon C. Lau, Waterloo, Canada

[73] Assignee: NCR Corporation, Dayton, Ohio

[21] Appl. No.: 862,400

[22] Filed: Apr. 2, 1992

[51] Int. Cl.⁵ .......................................... G06K 9/20
[52] U.S. Cl. ...................................... 382/48; 382/7; 382/22; 382/61
[58] Field of Search .................. 382/22, 48, 26, 21, 382/7, 61

[56] References Cited

U.S. PATENT DOCUMENTS

| | | | |
|---|---|---|---|
| 4,542,829 | 9/1985 | Emery et al. | 382/7 |
| 4,611,345 | 9/1986 | Ohnishi et al. | 382/7 |
| 5,026,974 | 6/1991 | Franklin et al. | 382/7 |
| 5,033,096 | 7/1991 | Morrison et al. | 382/8 |
| 5,068,912 | 11/1991 | Concannon et al. | 382/61 |
| 5,068,913 | 11/1991 | Sugiura | 382/61 |
| 5,083,063 | 1/1992 | Brooks | 382/7 |
| 5,138,670 | 8/1992 | Nakajima et al. | 382/61 |

Primary Examiner—Joseph Mancuso
Attorney, Agent, or Firm—Elmer Wargo

[57] ABSTRACT

A method and apparatus for detecting where useful image data about a document exists within a stream of successive scans of image data coming from an imaging camera positioned at a scanning line in an imaging system. A reference member having first, second, and third marks thereon is positioned at the scanning line. Several scans of the reference member provide a reference scan which is retained in the system. When a document reaches the scanning line and is imaged by the imaging camera, a change in the pattern of pixels associated with the reference scan is used to signal the leading edge of a document. After the leading edge is detected, the first mark on the reference member is used to detect from the image data whether or not the document has a folded over portion near the leading and bottom edges of the document. The third mark is used to detect from the image data the location of the top of the document. When the pattern of pixels reverts to the reference scan, it is an indication of the trailing edge of the document. A rapid "roll-off" in a white image from the reference scan is used to detect the bottom edge of the document near a dark side of the document track. The useful image data from the mass of pixel data coming from the imaging camera is detected without using external sensors to detect the leading and trailing edges of the documents, for example.

26 Claims, 14 Drawing Sheets

METHOD AND APPARATUS FOR DETECTING THE LEADING AND TRAILING EDGES OF A DOCUMENT IN AN IMAGE BASED SYSTEM

CROSS REFERENCES TO RELATED APPLICATIONS

1. U.S. application, Ser. No. 630,454 filed on Dec. 19, 1990 by David G. LANT for *TABLE TOP HARDWARE FOR IMAGING DOCUMENTS*.

2. U.S. application, Ser. No. 741,275 filed on Aug. 7, 1991, by Graham Luckhurst for *CONTROL CIRCUIT FOR AN IMAGER USED IN A DOCUMENT PROCESSING MACHINE*.

Both of the above-named applications are assigned to the same assignee as is the present application.

BACKGROUND OF THE INVENTION (1) Field of the Invention

This invention relates to a method and apparatus for detecting where useful image data about a document exists within a stream of successive scans of image data coming from an imaging camera positioned at a scanning line.

(2) Background Information

There is a trend in the processing of documents to move the documents past a scanning line where an imaging camera is located to obtain image data about the document. The camera produces successive scans of image data or pixels as each document is moved past the scanning line. The image data is processed to obtain information or data about the documents.

One of the problems with working with image data is that it is sometimes difficult to extract the useful image data from that image data which does not contain pertinent data about the document. One of the ways of selecting useful image data from a stream of successive scan lines of pixels is to use an external leading edge detector, for example, which is positioned upstream from the scanning line and imaging camera. By knowing the velocity at which a document is being moved towards the scanning line and by knowing how far the leading edge detector is located from the scanning line, a reasonable approximation of the start of the useful image data of the document may be obtained.

Another trend in the processing of documents is to make the machines or terminals which process the documents smaller or to provide the machines with a smaller "footprint". Having external sensors to detect the leading and trailing edges of documents and having external sensors to detect the height of documents passing the imaging camera tend to make the task of making the machines smaller more difficult. Having to process image data which is unnecessary or not pertinent also tends to increase the machine time for processing the image data.

SUMMARY OF THE INVENTION

An object of this invention is to obviate the problems mentioned in the Background Of The Invention A feature of this invention is that useful image data about a document is selected from a series of successive scans of data without using external sensors. The useful data is selected with regard to the leading and trailing edges of the document and also with regard to the top and bottom of the document.

Another feature of this invention is that it is relatively simple and inexpensive to implement.

Another feature is that the techniques employed facilitate the locating of "dog ears" on a document. A "dog ear" occurs when a corner of the document is inadvertently folded over upon itself, with the possibility that pertinent image data about the document may be missed.

In a first aspect of this invention, (in an imaging system which uses an imaging camera to generate successive scans of pixels about a document having a leading edge, a trailing edge, a bottom edge, and a top edge, with said document being moved on said bottom edge past a scanning line in said imaging system), there is provided a method of processing said successive scans of pixels from said scanning line comprising the steps of:

(a) positioning a reference member at said scanning line in said system; and (b) using said successive scans of pixels from said imaging camera relative to said reference member and said document to function both as image data about said document and as sensor data for determining the locations in said image data of said leading, trailing, top, and bottom, edges of said document.

In a second aspect of this invention, there is provided an imaging system comprising:

an imaging station having a scanning line thereat;

a reference member positioned at said scanning line;

document transport means for moving a document to be imaged to said imaging station;

an imaging means, including an imaging camera, for generating successive scan lines of pixels about said reference member when no document is present at said scanning line and for generating successive scan lines of pixels about said document when said document is moved past said scanning line in operative relationship with said imaging camera; and processing means for using said successive scans of pixels from said imaging camera relative to said reference member and relative to said document to function both as image data about said document and as sensor data for determining the locations of the leading, trailing, and top edges of the document in said image data.

The above advantages and features will be more readily understood in connection with the following description, claims, and drawing.

BRIEF DESCRIPTION OF THE DRAWING

FIG. 11 is a diagram showing the relationship between the top of the image data associated with a document and the reference member shown in FIG. 1.

DESCRIPTION OF THE PREFERRED EMBODIMENT

Figure 1:
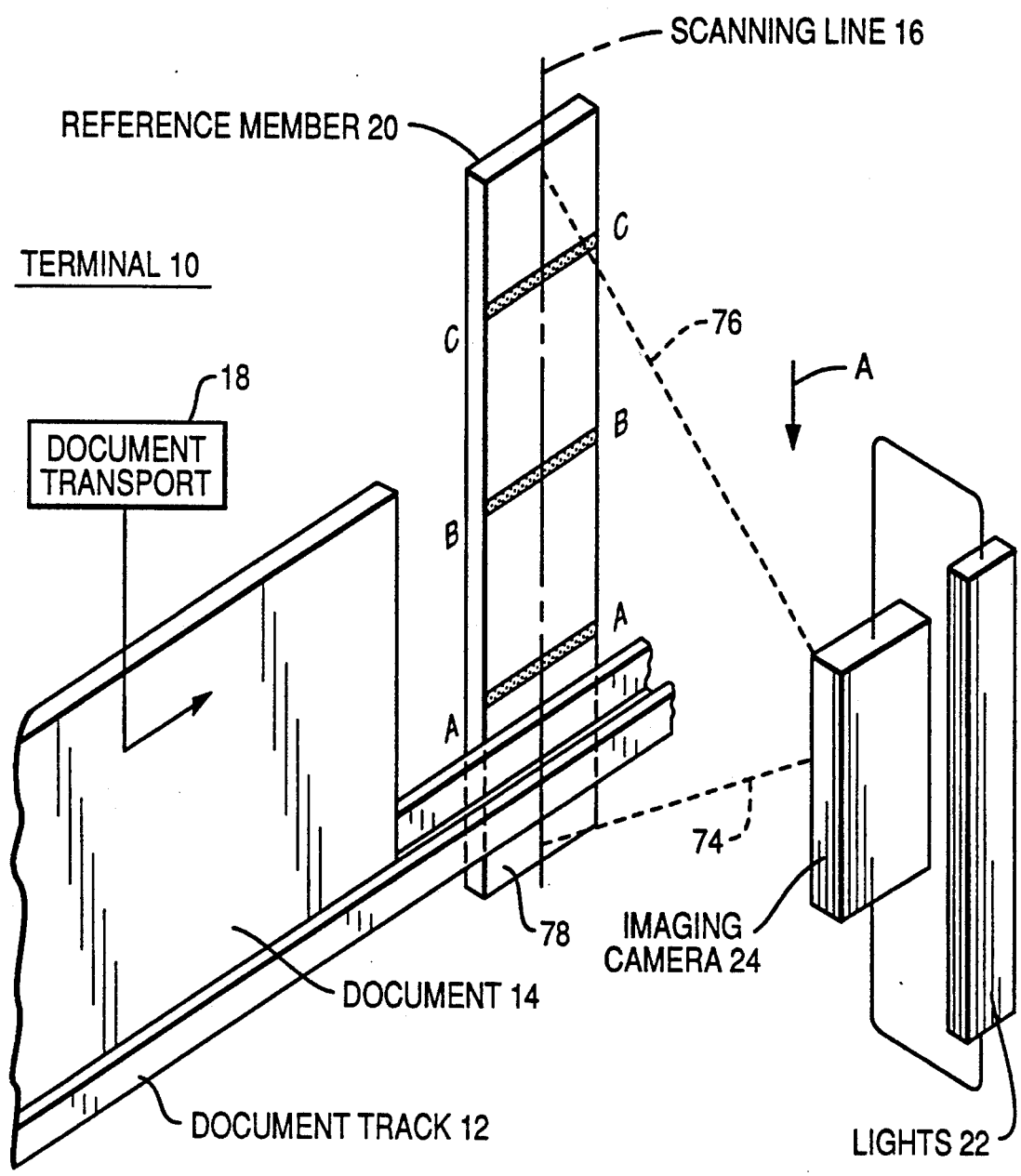
FIG. 1 is a schematic diagram showing a terminal having an imaging camera therein for imaging a document moved past a scanning line at which a reference member is positioned.

FIG. 1 shows a portion of a terminal 10 in which this invention may be used. Typically, the terminal 10 may process documents like checks, for example. The terminal 10 may be of the type disclosed in the co-pending applications mentioned earlier herein.

For the moment, it is sufficient to state that the terminal 10 has a document track 12 therein in which a document 14 is moved towards a scanning line 16 by a document transport 18. A special reference member 20 is positioned on one side of the document track 12 so that the document 14 can be moved in front of the reference member 20 when the document is moved to and past the scanning line 16. While the document 14 is being moved past the scanning line 16, light from the lights 22 illuminates the document 14 while an imaging camera 24 generates image data from the document 14 at the scanning line 16.

Figure 2:
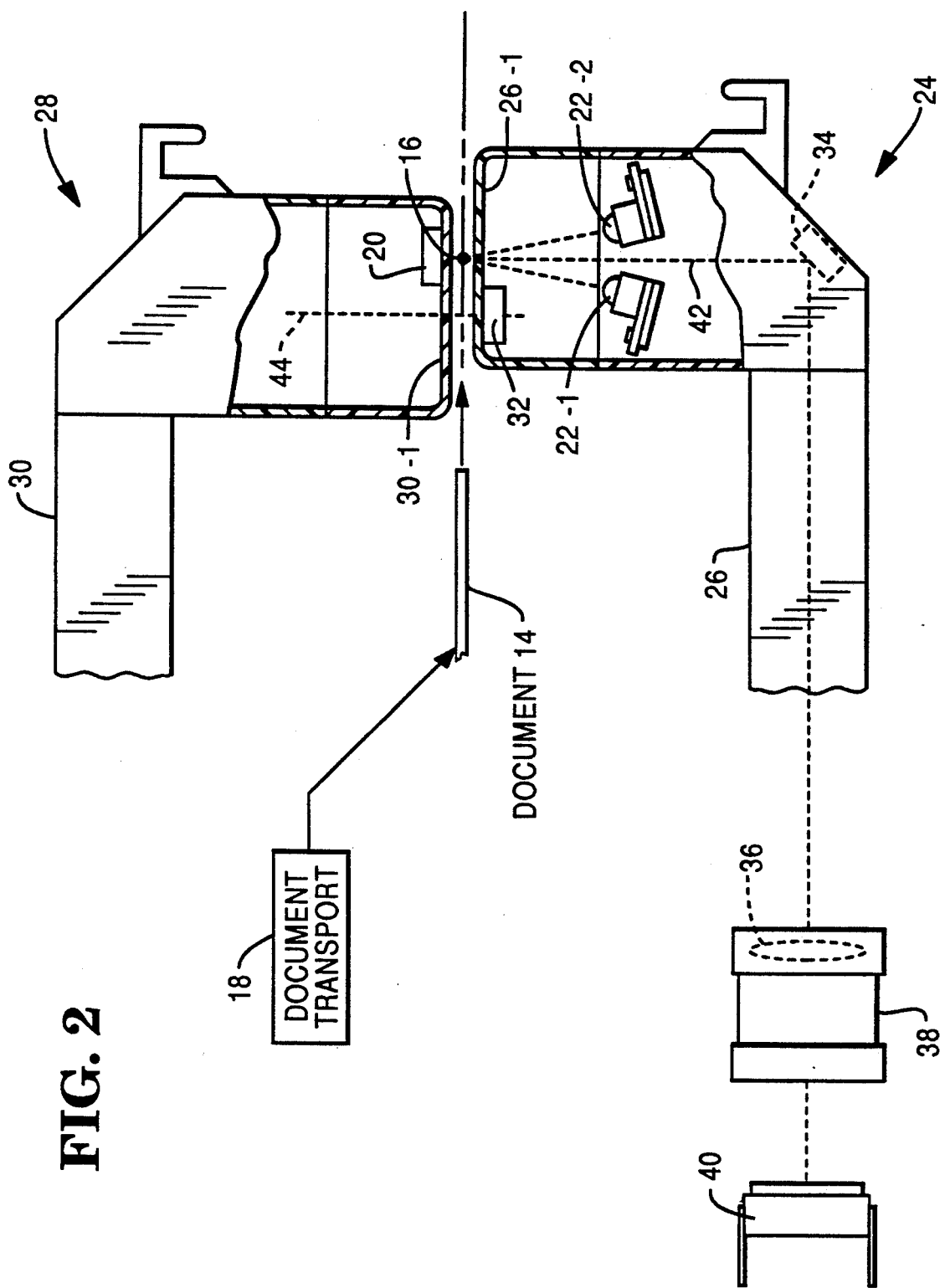
FIG. 2 is a top plan view of a preferred form of an imaging camera which may be used in the terminal shown in FIG. 1, with this view taken from the direction of arrow A shown in FIG. 1.

FIG. 2 shows a preferred embodiment of the imaging camera 24 shown only schematically in FIG. 1. The imaging camera 24 includes a housing 26 to house the lights 22, shown as 22-1 and 22-2 in FIG. 2, with their light being directed through a transparent end 26-1 of the housing towards the scanning line 16. The imaging camera 24 is used to image data from the front of the document 14, while a second imaging camera 28 may be used to image the rear of the document 14. The second imaging camera 28 is substantially identical to the imaging camera 24. The reference member 20 may be positioned as shown in FIG. 1 or it may be positioned inside the housing 30 of the second imaging camera 28. The housing 30 has a transparent end 30-1 therein to enable light from the lights 22-1 and 22-2 from the first imaging camera 24 to reach the reference member 20. The first imaging camera 24 has a reference member 32 therein to enable it to be used by the second imaging camera 28. The document 14 passes between the first and second imaging cameras 24 and 28 as shown.

The imaging camera 24 also includes a mirror 34 (silvered on its front surface) to direct reflected light from the reference member 20 or a portion of the document 14 at the scanning line 16 through a lens 36. The lens 36 is mounted in a barrel 38 which is used to adjust the lens 36 in an axial direction so as to maximize the light falling on a charge coupled device (CCD) 40 which is part of the imaging camera 24. The imaging camera 24 has an optical axis 42 which is positioned slightly downstream from the optical axis 44 of the second imaging camera 28 when considering document movement as going from left to right as viewed in FIG. 2.

Figure 3:
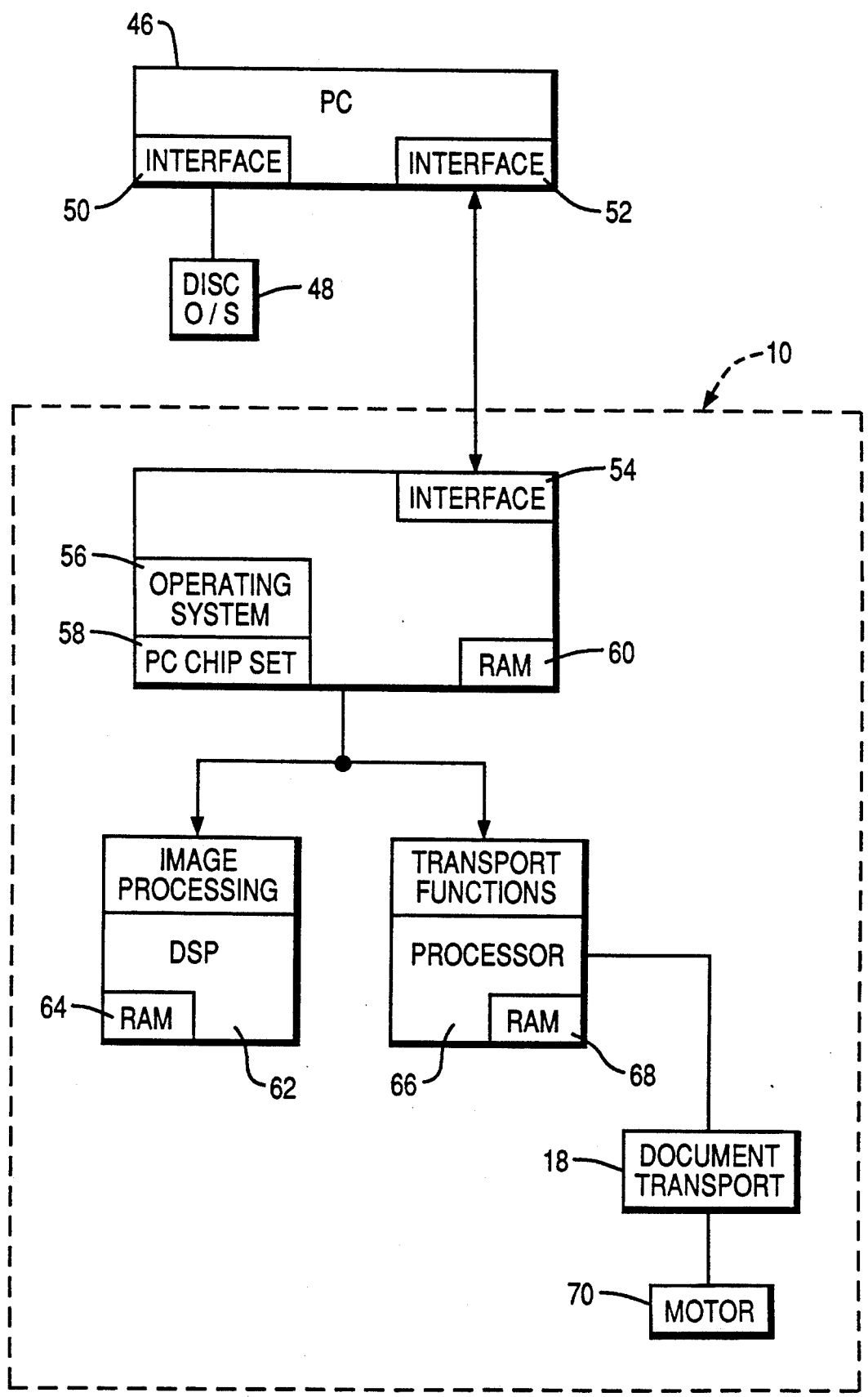
FIG. 3 is a control means used with the terminal shown partially in FIG. 1.

Before proceeding with a discussion of this invention, it appears appropriate to discuss some of the processing or control means which are used therewith. The terminal 10 may be of the type which is controlled by software which is downloaded from a personal computer PC 46, as shown in FIG. 3. The PC 46 may have the associated software, application programs, and Operating System 0/S stored on a disc 48 and accessed through an interface 50. Another interface 52 is used to couple the PC 46 to the terminal 10 via an interface 54. The terminal 10 has an operating system 56, a PC chip set 58, and RAM 60 for executing the instructions included in the operating system 56. The terminal 10 also includes a Digital Signal Processor (DSP) 62 and a RAM 64 for image processing, and it may also include a processor 66 and a RAM 68 for handling transport functions. The document transport 18, alluded to earlier herein, is controlled by the processor 66. The document transport 18 includes a motor 70 for moving the document 14 bi-directionally as may be required for imaging the front and rear of the document 14. In a general sense, the software for operating or controlling the operation of the terminal 10 may be downloaded from the PC 46, and the operating instructions for performing the image processing (to be described) may be downloaded to the DSP 62 from the operating system 56.

In the embodiment described, the imaging camera 24 is turned on whenever the terminal 10 is turned on and is instructed by the PC 46 to image a document 14. The imaging camera 24 outputs image data after it is turned on, and when no document is present at the scanning line 16, it means that most of the data outputted is meaningless data.

The reference member 20 is an important element in eliminating meaningless data from being processed. In this regard, the reference member 20 (FIG. 1) has three black stripes located horizontally thereon, with the reference member being pure white so as maximize the amount of light being reflected therefrom. The first stripe A—A is located close to the document track 12 and is referred to as a "dog ear" mark. The second stripe B—B is located near the center of the scan generated by the imaging camera 24 and is referred to as a "mid-scan mark". The third stripe C—C is located near the top of the scan generated by the imaging camera 24 and is referred to as a "top-scan mark". In the embodiment described, the scanning performed by the imaging camera 24 is performed from the bottom of the document 14 towards the top thereof as viewed in FIG. 1. Because the documents which are to be processed by the terminal 10 may have a variety of lengths and heights, it is useful to start the scanning from the bottom of the document 14. This means that meaningful data exists from the bottom of the document towards the top, and as soon as the top of the document 14 is reached for a particular document, that is the end of the meaningful data for that document.

As an overview, the method of this invention comprises the steps of:

(a) using the imaging camera 24 to obtain a reference scan pattern of pixels from the reference member 20 positioned at a scanning line 16 in the imaging system when no document 14 is positioned at the scanning line 16;

(b) examining successive scans of pixels from the imaging camera 24 as the document 14 is moved towards said scanning line 16 to find a change in the reference scan pattern of pixels; and (c) using the change in the reference scan pattern of pixels as the means of detecting a predetermined edge (like the leading edge) of the pixels associated with the document 14.

In some prior art systems, the leading and trailing edges and the tops of the documents being imaged were obtained by using separate sensors, as previously stated. In the present invention, these edges and tops of documents are obtained without using separate or discrete sensors. This simplifies the construction of the terminal 10, reduces its cost, and also enables it to present a small footprint.

One of the first steps in the method of this invention is to obtain a reference scan pattern of pixels from the reference member 20 positioned at the scanning line 16 when no document 14 is present. In the embodiment described, there are 1024 pixels or picture elements generated by the imaging camera 24 at the scanning line 16, although this number could change for different applications. The imaging camera 24 generates gray scale levels ranging from 0 which is pure black to 255 which is pure white.

Figure 4:
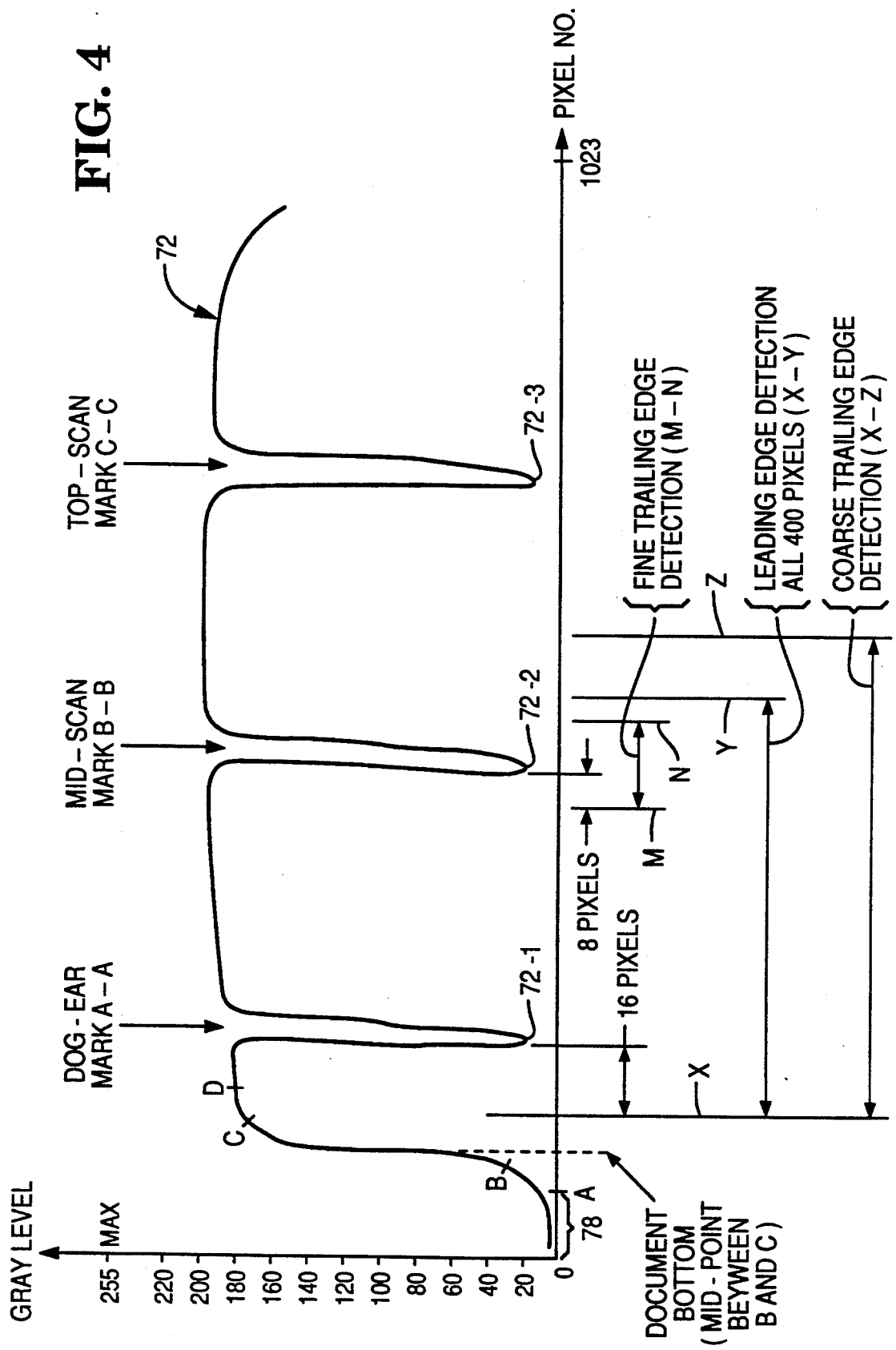
FIG. 4 is a diagram showing a typical reference pattern of pixels resulting from scanning the reference member shown in FIG. 1.

When a scan of the reference member 20 is made by the imaging camera 24, a reference scan pattern 72 of pixels is obtained, with a typical scan pattern 72 being shown in FIG. 4. The X or horizontal axis of FIG. 4 shows the pixels in a single scan, with the bottom of the scan starting at pixel zero at the left and with the top of the scan ending with pixel 1023 at the right of this figure. The gray scale value for each of the pixels in a scan of pixels ranges from 0 (black) to 255 (white), and these values are shown along the Y or vertical axis.

There are several points to note about the reference scan pattern 72 of pixels shown in FIG. 4. Notice from FIG. 1 that the imaging camera 24 has a cone of scanning as represented by dashed lines 74 and 76, and that there is an area (shown only generally as 78) of scanned area which lies behind and below the document track 12 which is made of non-reflecting material. The area 78 is shown between 0 and A in FIG. 4. As the scanning moves above the document track 12, there in an increase in the output of the pixels at the scanning line 16 as shown between A and B of FIG. 4. From B to C on the reference scan pattern 72, there is a very sharp transition from dark to very bright, and as the scan approaches the stripe A—A, there is a leveling off of intensity as shown by C to D. There is a trough 72-1 in the scan pattern 72 resulting from the stripe A—A, and similarly, there are troughs 72-2 and 72-3 resulting from stripes B—B and C—C, respectively, as the scanning proceeds towards the top of the reference member 20, as viewed in FIG. 1.

Figure 5:
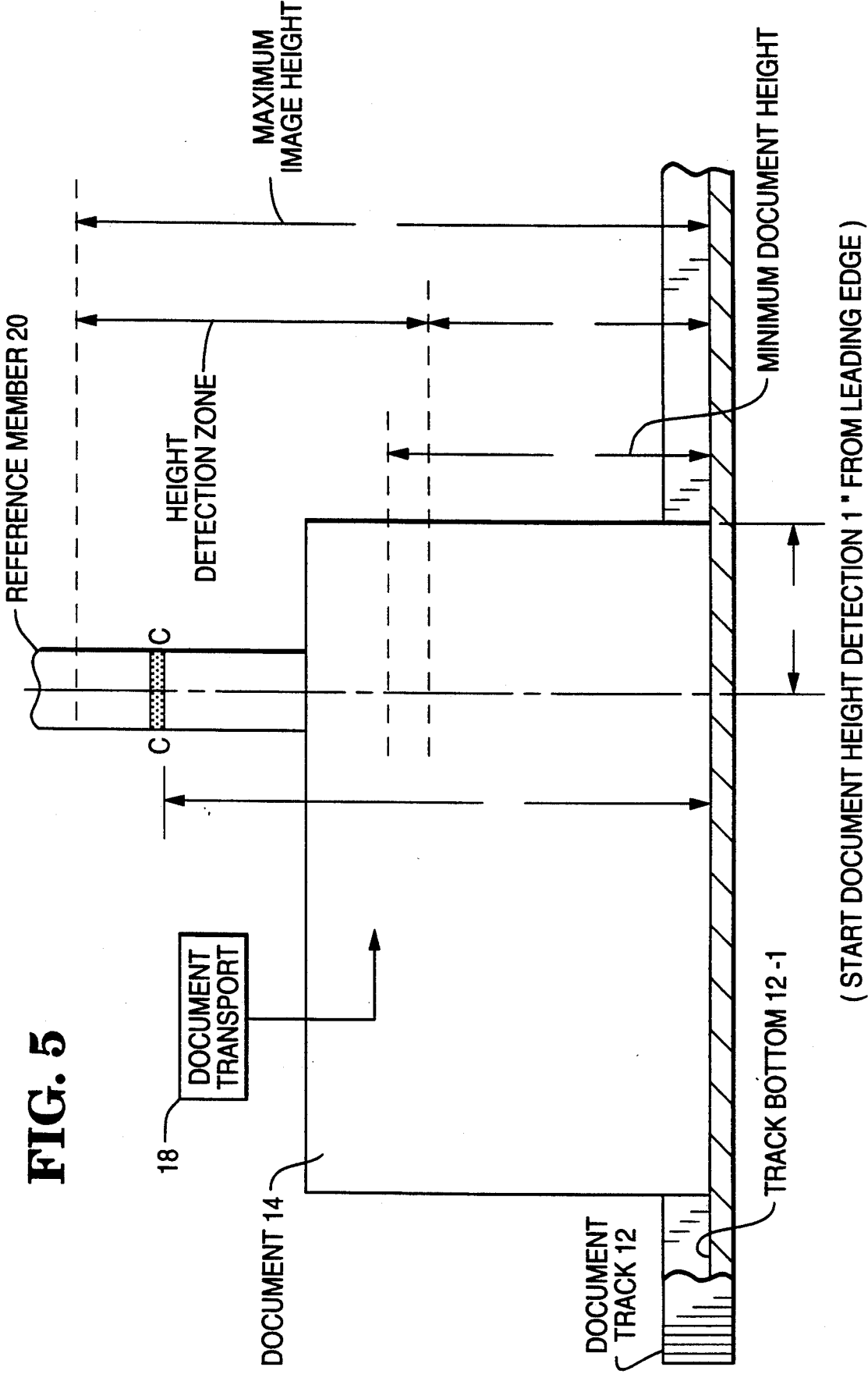
FIG. 5 is a diagram showing some physical dimensions associated with a preferred embodiment of this invention.

FIG. 5 is a diagram showing the physical dimensions of a preferred embodiment of this invention, although the dimensions may change to suit particular applications. Several of the dimensions given are referenced from the track bottom 12-1 as shown. The minimum document height expected in the terminal 10 is 2.5 inches, while the maximum document height is 4.2 inches. The third or top scan mark C—C is located 3.75 inches from the track bottom 12-1. The terminal 10 is designed so that a height detection feature comes into play at a point which is 2.25 inches above the track bottom 12-1 and extends to a point which is 1.95 inches above so as to perform height detection for the range of documents anticipated by the terminal 10.

Another feature of this invention is that the reference member 20 is designed so that the first or dog-ear mark A—A and the third or top-scan mark C—C are equally positioned from the second stripe or mid-scan mark B—B. This design provides a symmetry and facilitates the assembly of the terminal 10 because an assembly operator cannot make a mistake in mounting the reference member 20 improperly. The location of the dog-ear mark A—A was determined empirically so as to be in a position for detecting document dog ears or turned over portions which might occur where MICR data occurs in the bottom right corner of the document 14, like a check. This aspect will be reviewed hereinafter.

To review briefly, the reference scan pattern 72 of pixels shown in FIG. 4 represents the image data coming from the reference member 20 when no document 14 is in front of the reference member 20 at the scanning line 16. When a document 14 reaches the scanning line 16, it disturbs the reference scan pattern 72 to generally indicate the start or the leading edge of the document 14. In some situations, noise may give a false reading as to the start of the useful image data related to the document 14. A noise compensation procedure is needed to distinguish between the leading edge of a document 14 and noise.

Figure 6:
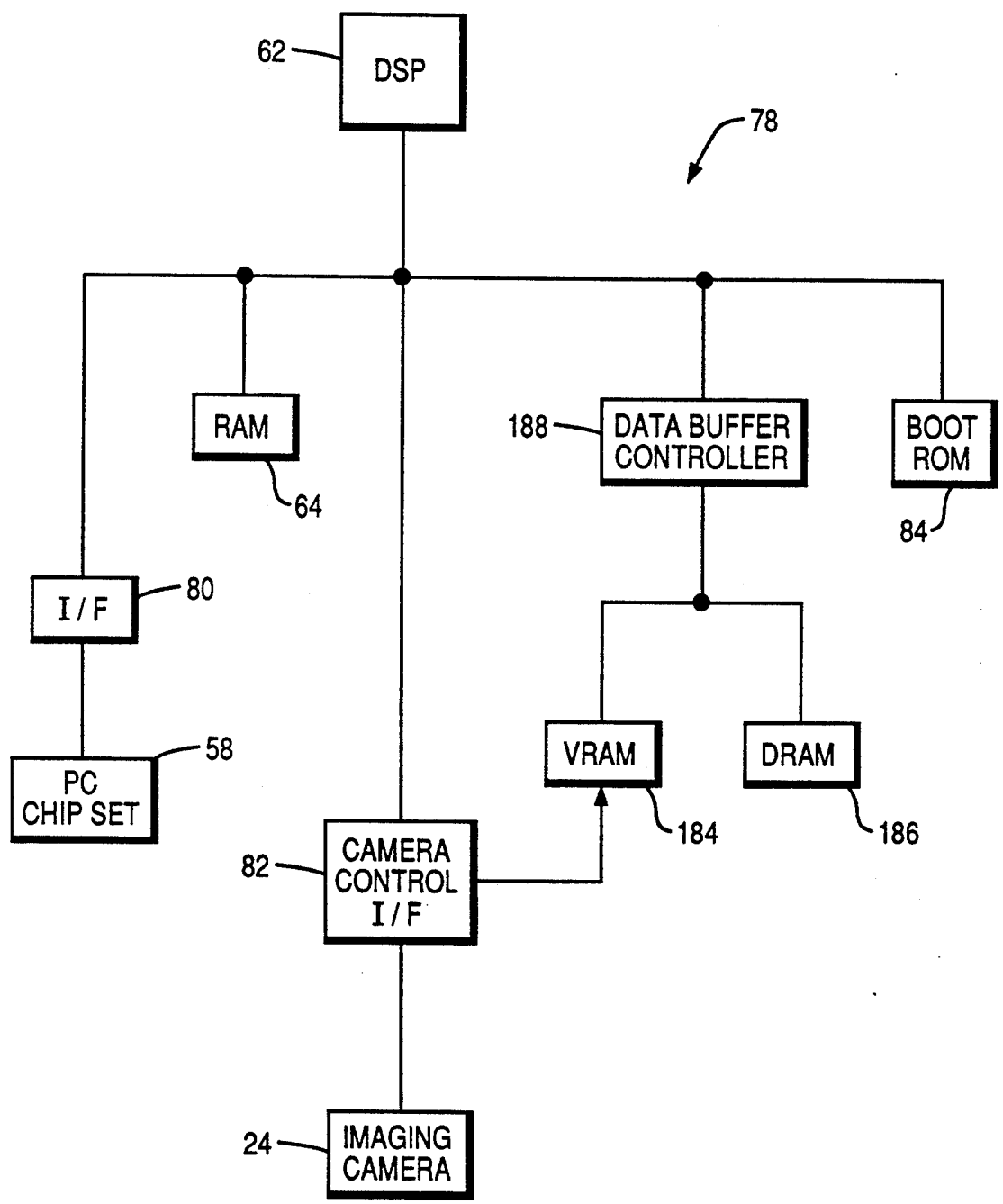
FIG. 6 is a schematic diagram showing circuitry or processing means which is used for image processing.

The noise compensation procedure, along with other procedures to be described herein, are carried out using the circuitry 78 shown in FIG. 6. The circuitry 78 includes the DSP 62 and the RAM 64 already alluded to. There is an interface 80 coupling the DSP 62 with the PC chip set 58. The output of the imaging camera is coupled to a camera control and I/F circuit 82 which processes the signals from the imaging camera 24. A conventional boot ROM 84 is used to boot up the circuit 78. The software for controlling the various procedures and functions to be described is transferred via the PC chip set 58 (FIG. 3) to the RAM 64.

As far as noise compensation is concerned, there are two kinds of noise. The first kind is DC scan noise, and the second kind is AC pixel noise. The DC noise is a common-mode noise signal which affects every pixel in the scan line in the same manner, simultaneously; the effect of this type of noise is that light and dark bands appear in the image when the image data resulting from the scanning is viewed on a display. Another way of stating it is that the DC noise tends to make the scans of pixels go lighter or darker for the same object being viewed as time goes by. The AC pixel noise is "white noise" which randomly affects the pixels in a scanning line; the effect of this kind of noise is to appear as random white and dark specks in the image when displayed.

When an operator at the PC 46 (FIG. 3) initiates a transaction which entails the imaging of a document 14, for example, a suitable signal is sent from the PC 46 through the operating system 56 of the terminal 10 to the DSP 62 therein. The operator of the terminal 10 then drops the document 14 into the document track 12, and the document transport 18 moves the document 14 towards the scanning line 16. During this time, the imaging camera 24 continues to output data from the scanning line 16 without regard as to whether it is valid data or meaningless data. However, at this time, the noise compensation procedure discussed generally above is begun.

The noise compensation procedure is effected in the following manner. While the document 14 is moving towards the scanning line 16, the DSP 62 takes sixteen raw scans of the reference member 20 and averages them to arrive at an average gray scale pixel value for each one of the pixel positions in the scanning line. This means that there is an average of 16 pixel values for pixel position #0, pixel position #1, and pixel position #3, etc., through pixel position #1023 in the embodiment described. Sixteen samples per pixel position give a more adequate appraisal of the noise factor than does a single scan of samples.

There are 32 pixels located below the bottom (12-1) of the document track 12 (FIG. 7) which are used in the compensation of DC noise. The 32 pixels (shown by double arrow 86 in FIG. 7) extend along the scanning line 16 from the bottom of the cone of scan represented by the dashed line 74 shown in FIG. 1 to the imaginary dashed line 74-1. The imaging camera 24 is set up so that there is a minimum of 52 pixels (shown by double arrow 87) or a distance of 0.26 inch from the bottom of the scan (shown by dashed line 74 and the bottom 12-1 of the document track 12. The 32 pixels, shown by double arrow 86, are not exposed to external light, and therefore, they represent fluctuations in the DC noise levels. In the embodiment described, the 32 pixels (shown by double arrow 86) represent a height of 4 mm or 0.157 inch as measured along the scanning line 16. It should be recalled that there are 16 raw scans comprising the reference scan; the 32 pixels included by double arrow 86 are the result of 16 scans of data for the reference scan shown in FIG. 7 when used for the determination of DC noise levels. This aspect will be discussed later herein.

The DSP 62 (FIG. 7) calculates the average DC Drift (DC Drift) for each pixel position in the scanning line 16 in the following manner:

$$DC\ Drift = \frac{[SumCurrentNcPixels - SumRefNcPixels]}{32};$$

wherein:
SumCurrentNcPixels = Sum of noise compensation pixels in the current scan.
SumRefNcPixels = Sum of noise compensation pixels in the reference scan.

A raw pixel (each pixel position in the scanning line 16) is then compensated for the DC noise by using the expression:

DCCompensatedPixel = Raw Pixel + DCDrift. (EQ.1)

Figure 7:
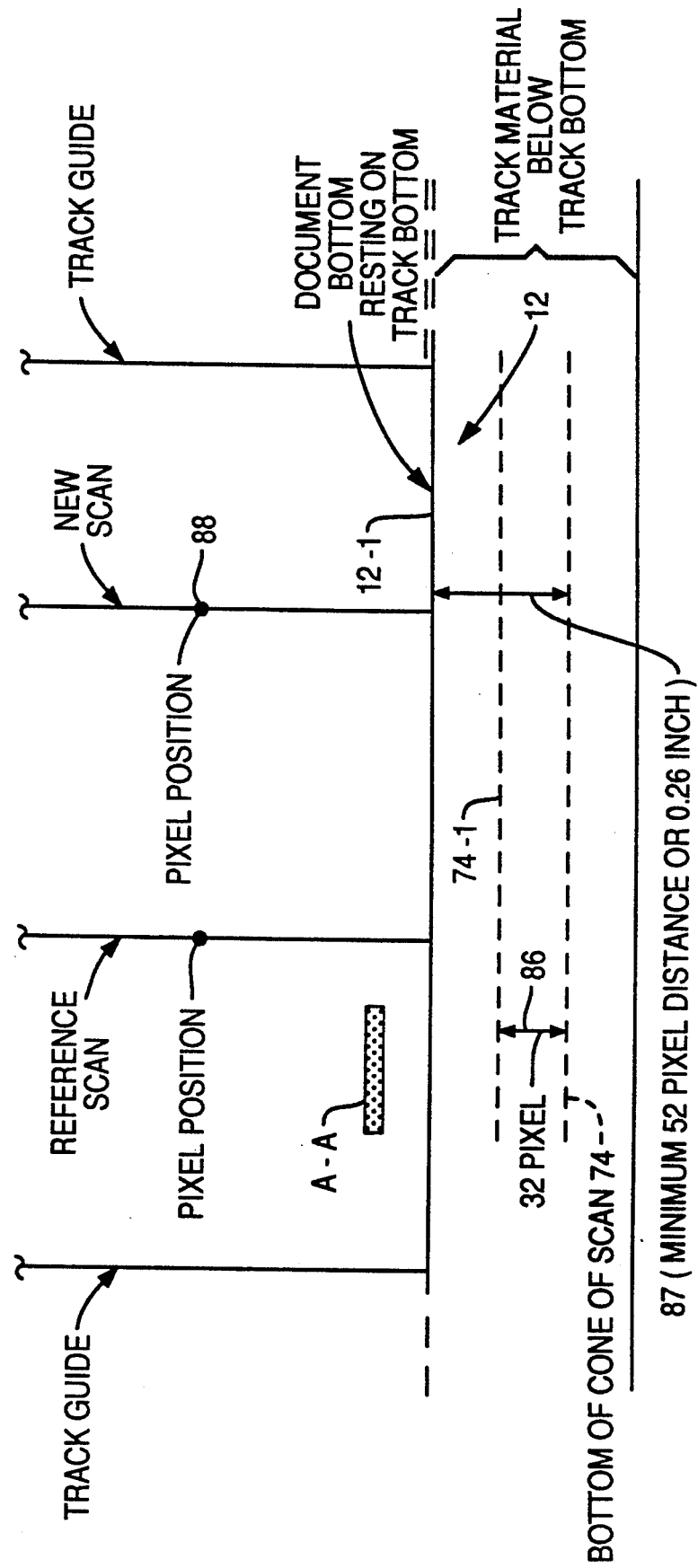
FIG. 7 is a schematic diagram showing relationships among certain pixels in the scanning line shown in FIG. 1.

Thus a raw pixel, like 88 in FIG. 7, is compensated for by the above equation EQ. 1. There is "limit checking" performed on the compensated pixel so that it is clipped to a minimum of (0) and a maximum (255) of gray scale values should it exceed these legal limits.

The AC pixel noise, alluded to earlier herein, is calculated after the DC noise compensation is effected. The DSP 62 (FIG. 6) captures the 16 scans of pixels included in the reference scan, compensates each one of the pixels in the scanning line 16 for DC drift as just described, and then calculates the difference between the value of each pixel in a new scan with the average value in the corresponding pixel position in the reference scan. For example, once the average for the 16 scans is obtained and compensated for DC noise, the amount by which each pixel position in scan #1 of the 16 reference scans exceeds the average of the 16 scans for that pixel position is noted. The same is done for each pixel position in the remaining 15 scans. The DSP 62 then obtains the widest difference or deviation by which a pixel position exceeds the average value for that pixel position; this widest difference provides the maximum AC noise encountered for each pixel position in the scanning line 16. As an added precaution, the widest difference mentioned is doubled to use as a measure of AC noise in the embodiment described.

After the DSP 62 determines the DC and AC noise values as described, the DSP 62 looks to find the bottom of the scanning line 16 as to where the bottom of the document 14 is located. This bottom will determine where the useful data starts with regard to the bottom of the document 14. The DSP 62 evaluates the averaged reference scan of data and looks for the location of the first stripe or dog ear mark A—A. This occurs where the gray scale level of the pixels drops to a certain level as shown in FIG. 4. The gray scale level of the pixels at point D in FIG. 4 is quite bright; however, the gray scale level begins to drop at point C. The roll off rate or that of increasing darkness occurs rapidly from point C to point B. From point B to point A, the roll off rate begins to taper off, meaning that the gray scale values of the pixels are not getting any darker as fast as they were. Because the points D, C, and B have been ascertained as described, and from the physical geometry of the document track 16 and the reference member 20, the location of the bottom of the document 14 is obtained by "counting back" a predetermined number of pixels by the DSP 62 from the reference scan pattern 72-1 (FIG. 4); the bottom of the document 14 lies between points C and B shown in FIG. 4. Another scheme for counting back relates to finding the midpoint between the points C and B shown in FIG. 4. Because the mid-scan mark B—B and the top-scan mark C—C bear a known relationship to the dog ear mark A—A and each other, as previously described, their locations are ascertained by the DSP 62.

At this point, the DSP 62 has a known pattern about the reference scan which it obtained from the average of 16 scans of the white reference member 20 in FIG. 1 as previously described. The DSP 62 then examines each of the incoming scans to determine whether or not the leading edge of a document 14 is approaching, as evidenced by a disturbance of the pattern of the reference scan.

Figure 8:
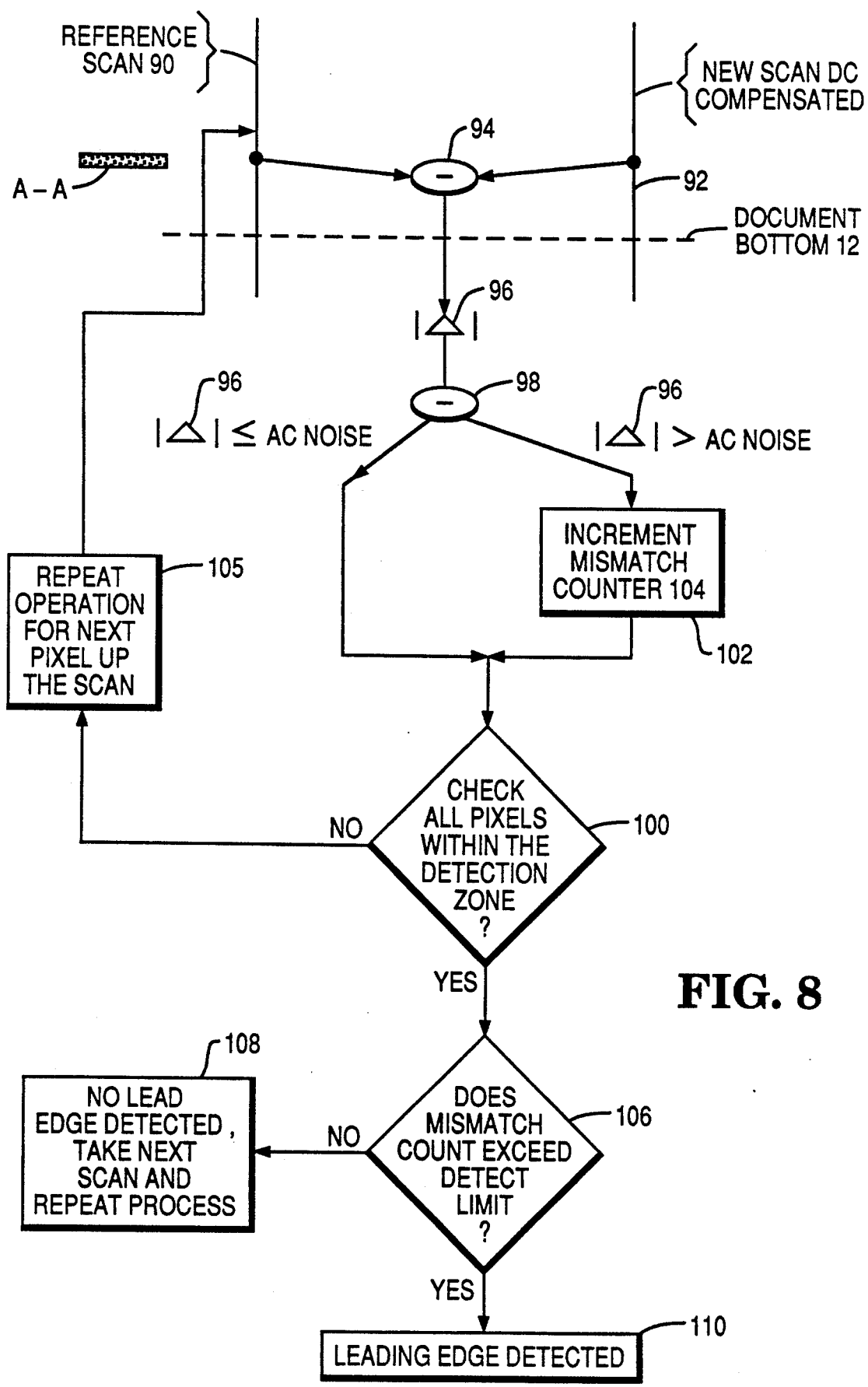
FIG. 8 is a schematic diagram showing a procedure for detecting the leading edge of a document at the scanning line shown in FIG. 1.

The procedure for examining each new scan relative to the reference scan 90 (which is really derived from the 16 scans as mentioned) is shown generally in FIG. 8. After a new scan 92 is DC compensated as described, the DSP 62 is used to subtract (at step 94) the new scan 92 from the reference scan 90 to arrive at a change or Delta value 96. This means that the pixel value at a pixel location in the new scan 92 is subtracted from the pixel value for the corresponding pixel location in the reference scan 90. The absolute value of the Delta value 96 is used in a comparison step 98. If the absolute value of the Delta value 96 is equal to or less than the AC noise value (which was determined using the method previously described), the process proceeds to step 100. If at step 98, the Delta value 96 is greater than the AC noise value, the process proceeds to step 102. At step 102, a mismatch counter 104 is incremented, with the count thereon being accumulated for each scanning line of pixels coming from the scanning line 16. From step 102, the process proceeds to step 100.

Continuing with the process for leading edge detection, at step 100 in FIG. 8, a check is made to determine if all the pixels within a scanning line 16 have been evaluated as described. If not all the pixels within the scanning line 16 have been evaluated, the process proceeds to step 105 at which a repeat operation is performed for the next pixel within the scanning line 16. In the embodiment described, the repeat operation 105 is performed for 400 pixels in the scanning line 16; these 400 pixels lie within a "leading edge detection zone (x-y)" shown in FIG. 4. The 400 pixels represent a document height of 2 inches which is close to the minimum document height expected in the terminal 10. If all the pixels within the scanning line 16 have been evaluated, the process proceeds to step 106. If the mismatch count on the counter 104 does not exceed a predetermined count or limit, a leading edge of a document has not been encountered, and the process proceeds from step 106 to step 108. Because no leading edge has been detected, the process at step 108 is repeated for the next scan of data coming from the imaging camera 24. If the mismatch count on counter exceeds the predetermined amount, it means that leading edge of a document 14 has been detected as shown at step 110. In the embodiment described, the predetermined amount or count on mismatch counter 104 which indicates the presence of leading edge of a document 14 is 12, although this amount could change for different applications. In effect, the count on the mismatch counter 104 represents the number of times that a pixel in a new scan exceeds the AC noise margin. When this count exceeds the predetermined amount, it means that there is a real disturbance caused by the leading edge of a document 14.

There is an additional variation in the process for detecting the leading edge of a document 14. This variation relates to having different AC noise margins for the white and black pixels which occur in the scanning line 16. Those pixels which comprise the various stripes on the reference member 20, as for example, dog ear stripe A—A, have an average dark pixel value. A value of 32 is added to this dark pixel value for the dog ear stripe A—A, and if this value is less than 64 in the embodiment described, then this value is used as representing the upper limit of a dark pixel value called the Black White Threshold. If the Black White Threshold value is more than 64 in the embodiment described, the value is simply capped at 64. It should be recalled that the gray scale values, in the embodiment described, range from 0 to 255. Referring to FIG. 8, at step 98 thereof, if the reference pixel value at a certain point in the scanning line is greater than the Black White threshold, it is regarded as a white pixel, and the AC noise margin previously described is used at step 98. However, if the reference pixel value is less than or equal to the Black White Threshold, it is considered a dark pixel. The dark AC margin to be used at step 98 is determined as follows: Dark AC noise margin = Black White Threshold − Reference Pixel Value.

The dark AC noise margin can then be used at step 98 to determine if the mismatch counter 104 should be incremented for the dark pixel in question. However, in the embodiment described, a simpler procedure is used to achieve the same result. This same result (determining whether or not to increment the mismatch counter 104 for a dark pixel) can be obtained through an alternate procedure without calculating the dark AC noise margin.

The alternate procedure is as follows: If the reference pixel at the pixel position in question is equal to or less than the Black White Threshold, it is regarded as a dark pixel. This Black White Threshold is then compared with the corresponding pixel from the new scan 92. If the new pixel value is greater than the Black White Threshold value, it exceeds the dark AC noise margin, and accordingly, the mismatch count on counter 104 must be incremented.

Another aspect which relates to the leading edge detection relates to step 102 shown in FIG. 8. In the embodiment described, when the mismatch counter 104 is to be incremented due to a dark pixel, the mismatch counter 104 is incremented by two counts, whereas when the mismatch counter 104 is to be incremented due to a white pixel, this counter is incremented by only one count. More weight is therefore assigned to a dark deviation than a white deviation because a deviation from a dark reference pixel position is considered more significant. Step 106 in FIG. 8 uses a detection limit of 12, as previously mentioned, to avoid wrong detection of the leading edge of a document 14 that could be caused by extraneous noise in the system. The detection limit of 12 is based on a setting of four dark pixels $(4 \times 2 = 8)$ and four white pixels $(4 \times 1 = 4)$. Once the leading edge of a document 14 is detected, the DSP 62 then begins to accept the scans of pixel data coming from the imaging camera 24 as valid data associated with the document 14.

The scan pattern disturbance phenomenon caused by the leading edge of the document 14 is effective because the white reference member with the black stripes or marks A—A, B—B, and C—C thereon is positioned behind the transparent end 30-1 of the housing 30 (FIG. 2). The leading edge of a document 14 scatters the light from the lights 22 and causes random light and dark patterns in the reference scan from the reference member 20. Because the document 14 is closer to the imaging camera 24 than the reference member 20, the image of the document 14 is generally brighter and different from the reference scan from the reference member 20. It is important that the image camera 24 be calibrated in a way to enable the white reference pixels to be at levels below saturation at least by the AC noise margin. Then, the leading edge detection techniques mentioned are not adversely affected by white clipping of the image scans.

The procedure for detecting the trailing edge of a document 14 passing the scanning line 16 is essentially the same as the procedure for detecting the leading edge of the document just described. Essentially, the DSP 62 looks for a scan which is like the reference scan associated with the reference member 20. Trail edge detection relies on the principle that the reference scan from the reference member 20 is unique and will be significantly different from the image of the document 14 until the document 14 moves out of the view of the imaging camera 24. When the scans of image data are found to be very "similar" to the reference scan from the reference member 20, the DSP 62 assumes that the document 14 has left the imaging camera 24 and "flags" that the trailing edge of the document 14 has been detected. Finding the trailing edge of the document 14 lets the DSP 62 know when to stop processing data from the imaging camera 24 and enables the DSP 62 to determine the length of the document 14.

When the DSP 62 looks for the leading edge of a document 14, it is not doing very much at the time. As soon as the leading edge of a document 14 is encountered, the DSP 62 is called upon to perform the processing of data from the image of the document 14. When the DSP 62 looks for the trailing edge of a document 14, it also does not have too much free time because it is still processing data from the document 14.

An effort was made to reduce the load on the DSP 62 when the DSP 62 is looking for the trailing edge of the document 14. This effort relates to dividing the process for looking for the trailing edge of a document 14 into a coarse detection process and a fine detection process. The coarse detection process relates to the pixels between X and Z shown on FIG. 4 which amount to 500 pixels out of the scan of 1,024 pixels in the scanning line 16 in the embodiment described. The fine detection process relates to the pixels between M and N shown in FIG. 4. There are 32 pixels between M and N which amount to an actual distance of about 4 mm wide; this area is located around the mid-scan mark B—B.

With regard to the coarse detection process there are 500 pixels in the coarse trailing edge area from X-Z of FIG. 4, as previously stated. Because the DSP 62 is very busy at this time, only every fourth pixel is utilized for looking for the trailing edge of the document 14; this means that only 125 of the 500 pixels are examined for this purpose. The coarse trailing edge area (X-Z) includes both the dog-ear mark A—A and the mid-scan mark B—B, while the fine trailing edge detection area M-N includes only the mid-scan mark B—B.

Figure 9:
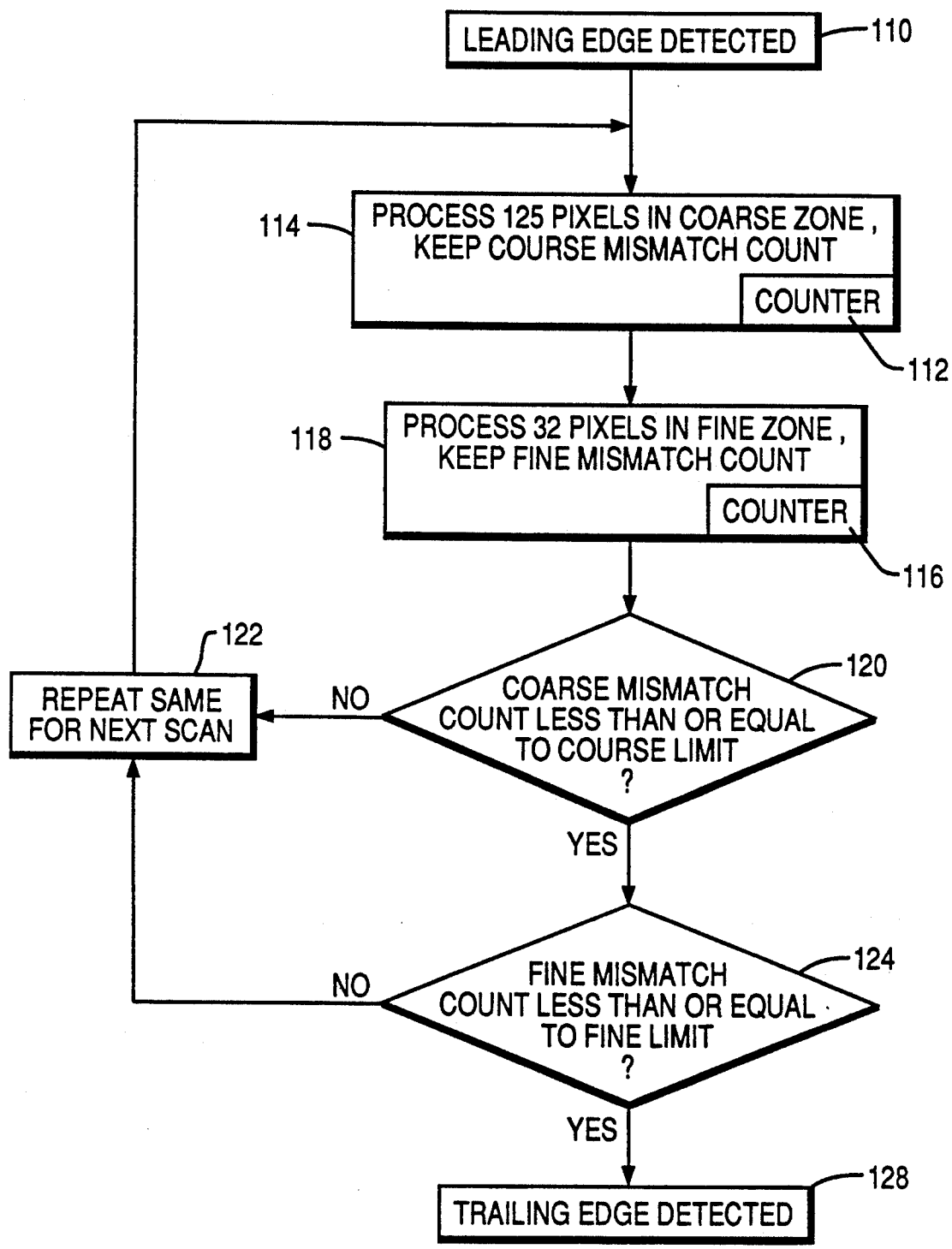
FIG. 9 is a schematic diagram showing a procedure for detecting the trailing edge of a document at the scanning line shown in FIG. 1.

After a leading edge of a document 14 is detected, a process to detect or look for the trailing edge of the document is initiated, with the process being shown in FIG. 9. The process entails examining a pixel in a new scan with reference to the corresponding pixel in the reference scan. In this regard, when a new pixel in a new scan of pixels differs by more than the AC noise margin discussed earlier herein, a mismatch counter 112 (shown only schematically) is incremented at step 114. The next stage in the process is to examine each of the pixels in the new scan in the fine zone area M-N shown in FIG. 4 with reference to the corresponding pixels in the reference scan. Again, if a new pixel in the new scan of pixels differs by more than the AC noise margin, a mismatch counter 116 is incremented at step 118. To summarize, the process so far has counted the number of dark and white deviations which have occurred in the coarse and fine zones using procedures which are similar to those described for leading edge detection.

After each scan is examined, as discussed in the previous paragraph, the process shown in FIG. 9 is used to examine the coarse mismatch count appearing on counter 112. If the count is more than a predetermined amount or limit, as shown at step 120, the process is repeated via step 122. The same situation is repeated at step 124 for the mismatch count appearing on the counter 116 for the fine zone shown by area M-N in FIG. 4. Finally, if both the coarse and fine mismatch counts are less than or equal to their associated limits, then the trailing edge of the document 14 is detected at step 128. In the embodiment described, the predetermined limits for the counter (coarse) 112 and the counter (fine) 116 are seven and six, respectively.

There are certain other activities which are performed to make sure that the trailing edge of the document 14 has in fact been detected. To minimize false readings, a minimum document length must have been determined before a signal indicating the trailing edge of the document 14 will be given by the DSP 62. In the embodiment described, the minimum length document anticipated by the terminal 10 is four inches long. The length of the document 14 is determined by counting the number of scans of pixel data occurring between the leading edge and the trailing edge of the document. Accordingly, the minimum length of a document 14 is set to 3.8 inches in the embodiment described. Similarly, if a leading edge of a document 14 is detected and no associated trailing edge is detected within a number of scans equivalent to 12.33 inches, the DSP 62 will report an error.

As alluded to earlier herein, there is a method for determining whether or not a "dog ear" or a folded corner exists on a document to be imaged. When looking at the face of the document 14, it is the lower right hand corner of the document where folded over portions of the document are of concern. It is this lower right corner which contains MICR data, and this data would not be recorded in the image of the document 14 if the corner were folded over. There are two purposes for dog ear detection; they are:

1. To find out whether or not a dog ear is present; and
2. If a dog ear is present, to find out how much of a dog ear is present.

If a dog ear is found, an operator at the terminal 10 is instructed (via the PC 46 in FIG. 3, for example) to remove the document 14, straighten out the dog ear, and re-enter the document so that it will be imaged properly.

Figure 10:
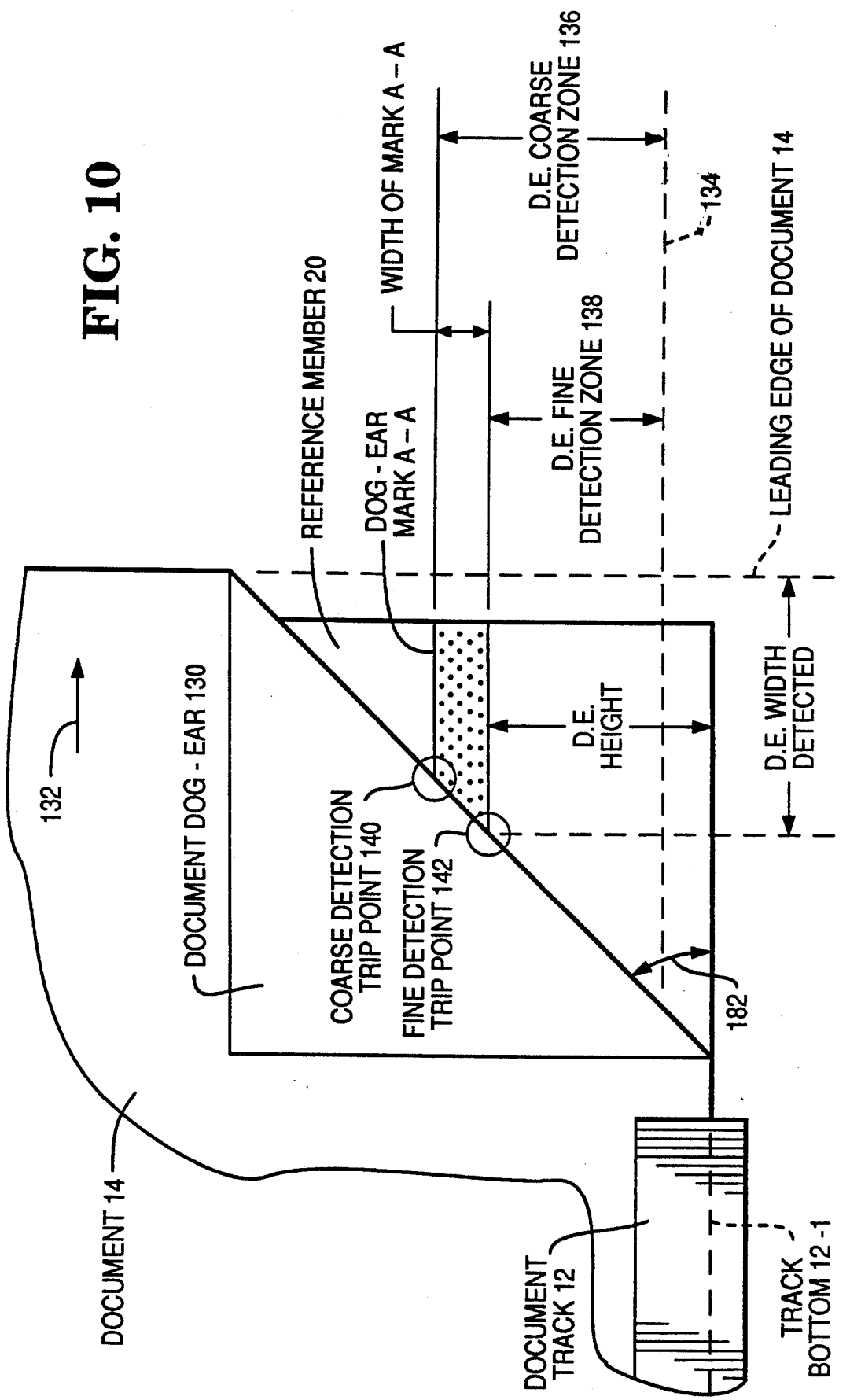
FIG. 10 is a schematic diagram showing a document having a "dog ear" or folded over portion at the scanning line shown in FIG. 1.

The basis for detecting a dog ear like 130 shown in FIG. 10 is as follows. Once the leading edge of a document 14 is found, the scans of pixels coming from the scanning line 16 tend to vary due to the image data on the document 14 itself. However, when a dog ear 130 exists at the lower right corner of the face of the document 14, as shown in FIG. 10, the data coming from this area does not change significantly from one scan to the next because this image data comes from the reference member 20. The techniques used are generally similar to those used in the detection of the leading edge of the document 14 as discussed relative to FIG. 8.

Before discussing the actual process for dog ear detection, it appears appropriate to discuss some of the physical parameters of a dog ear 130, as shown in FIG. 10. To orient the reader, the document 14 is moved in the direction of arrow 132 towards the reference member 20, with the dog ear mark A—A thereon. The document 14 is moved on its bottom edge which contacts the bottom 12-1 of the document track 12. In the embodiment described, the width of the dog ear mark A—A is 1 mm, and a dog ear coarse detection zone 136 extends from the top of the dog ear mark A—A to a dashed line 134 for a distance of 4 mm. A dog ear fine detection zone 138 extends from the bottom of the dog ear mark A—A to the dashed line 134 for distance of 3 mm.

Figure 12:
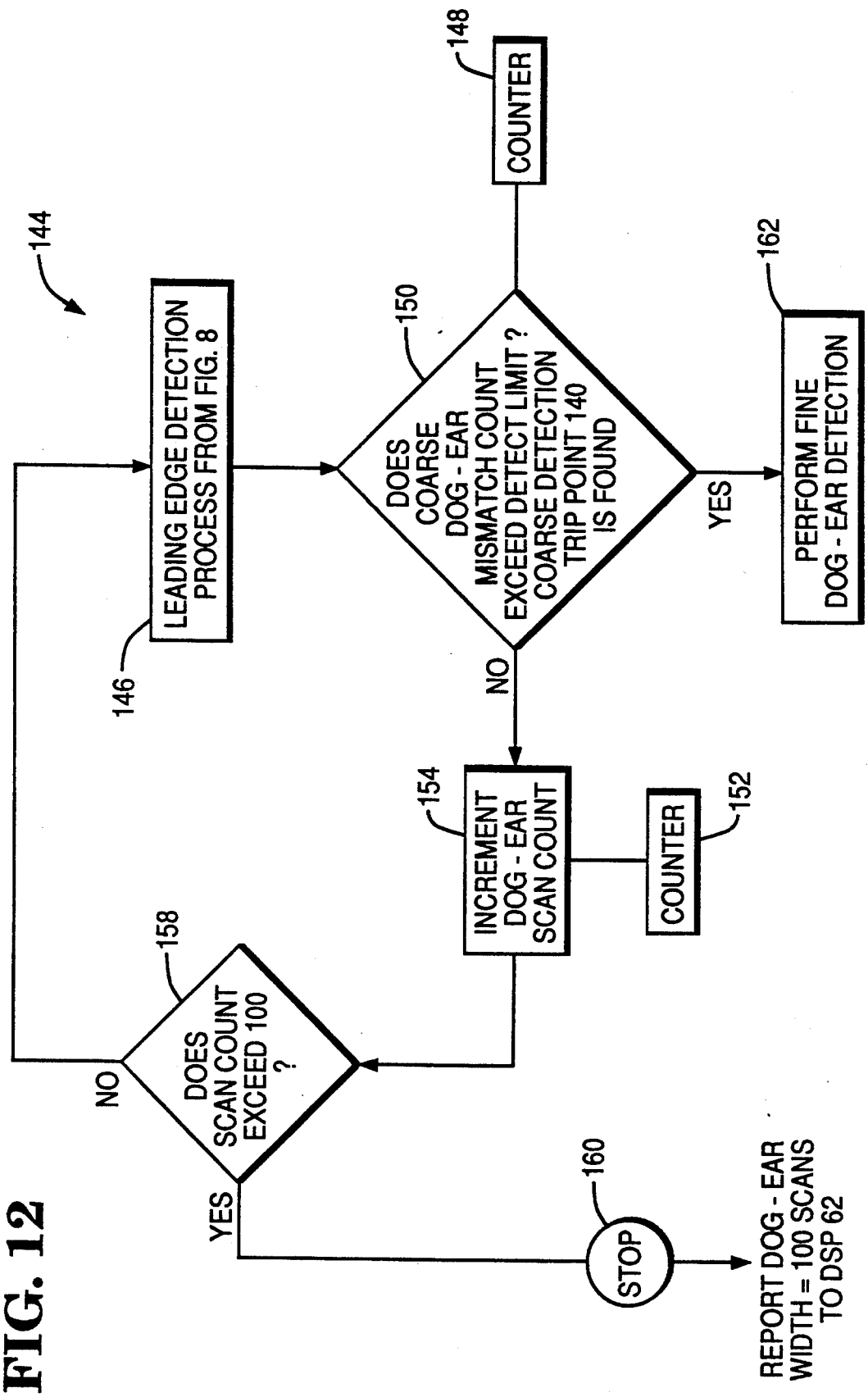
FIG. 12 is a schematic diagram showing a process for detecting a dog ear on a document.
Figure 13:
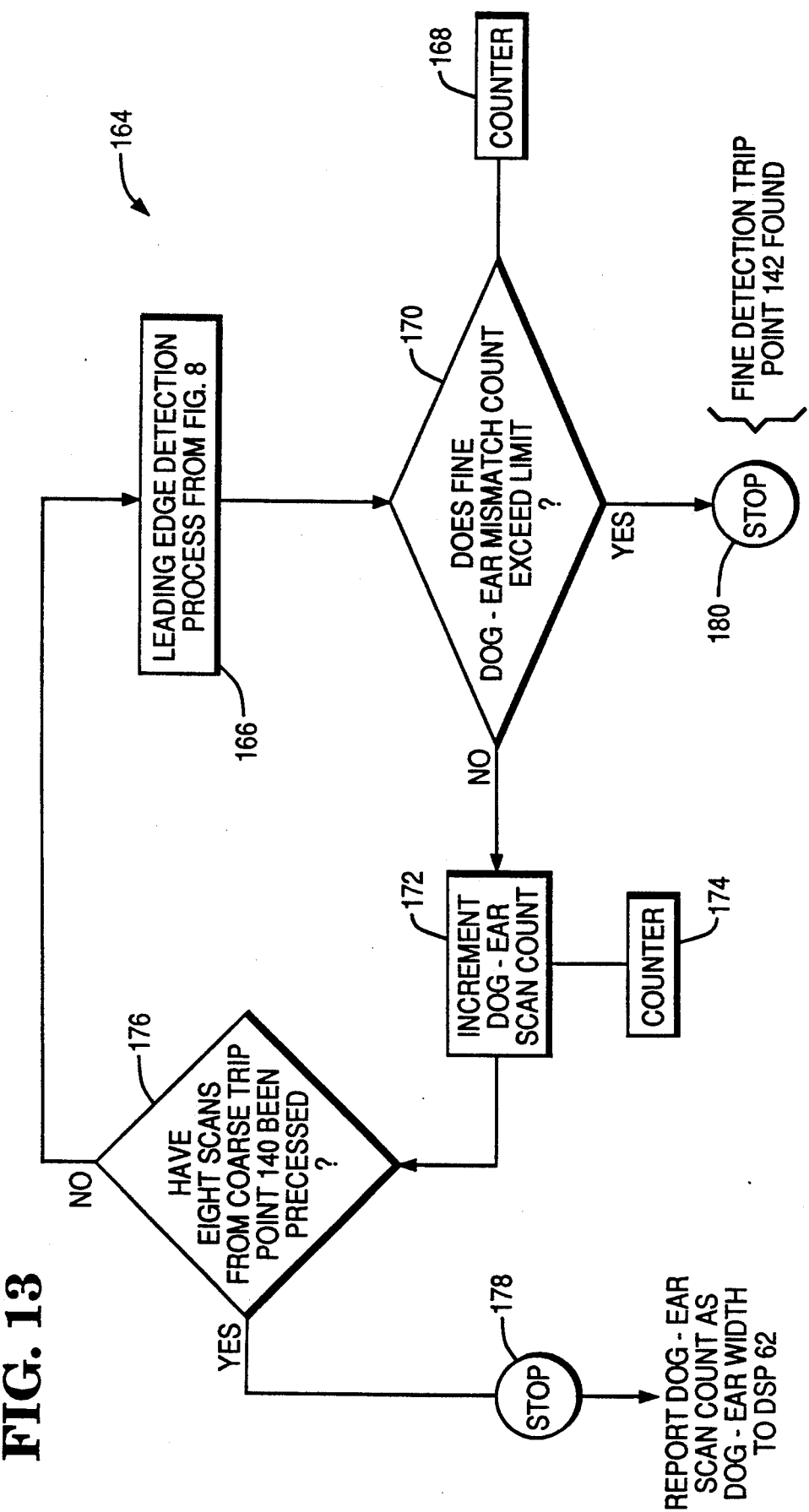
FIG. 13 is a schematic diagram showing some additional steps associated with the process for detecting a dog ear on a document.

As alluded to earlier herein, the techniques for dog ear detection are similar to those employed for the leading edge detection. In general, when the Delta value 96 exceeded the AC noise margin, as discussed in relation to FIG. 8, it meant that the possibility of a leading edge of the document 14 existed. When the Delta value 96 was greater than the AC noise margin for a predetermined number of pixels (as indicated on the mismatch counter 104), it meant that the leading edge of the document 14 was detected. In a similar manner, once the leading edge of the document 14 is detected, the process continues, in effect, to look for another "leading edge" which is referred to as a coarse detection trip point 140; this process is shown in FIG. 12. After the coarse detection trip point 140 (FIG. 10) is found, the process continues, in effect, to look for another "leading edge" which is referred to as a fine detection trip point 142; this process is shown in FIG. 13. Notice that as the document 14 is moved to the right, as viewed in FIG. 10, it is the leading edge of the document 14 which is first detected, and thereafter, the coarse detection trip point 140 is encountered, followed by the fine detection trip point 142.

The process 144 for finding the coarse detection trip point 140 (FIG. 10) is shown in FIG. 12. This process 144 begins after finding the leading edge of the document 14 as discussed in relation to FIG. 8, with the leading edge detection process being shown as block 146 in FIG. 12. To review, the new scan 92 (FIG. 8) has been compensated for DC noise as discussed earlier herein. The next step for looking for the leading edge of the document 14 is to look for delta value 96 to exceed the AC noise on a pixel by pixel basis for a predetermined count; this is embodied in block 146 in FIG. 12. After the leading edge of the document 14 is found, the process 144 examines the Delta value 96, and each time that the Delta value 96 exceeds the associated AC noise for that particular pixel in the scanning line 16, a count is incremented by one for a "white" pixel or by two for a "dark" pixel on a counter 148 (shown only schematically in FIG. 12). The count on the counter 148 is referred to as a coarse dog ear mismatch count. When the count on the counter 148 exceeds a count or limit of six in the embodiment described, it means that the coarse detection trip point 140 (FIG. 10) has been encountered; this evaluation is shown as step 150 in FIG. 12. If the count on counter 148 is not exceeded, a counter 152 is incremented at step 154 to record the number of scans that have been reviewed after the leading edge of the document 14 was detected but before the coarse detection trip point 140 has been encountered. The counters 148 and 152 are shown only schematically, and may be implemented through software associated with the DSP 62, for example.

Continuing with a discussion of the process 144 shown in FIG. 12, the number of scans which are recorded on the counter 152 are examined at step 158 to determine whether or not a count of 100 scans has been exceeded. If the number of scans is 100 or fewer, the process 144 returns to block 146 to repeat the process for another scan. Because the leading edge of the document 14 has already been detected, the process repeats the portion of the process which looks for the coarse detection trip point 140 (FIG. 10). If more than 100 scans (or the equivalent of 0.5 inch) have been examined at step 158, the process 144 stops at step 160. The fact that no coarse detection trip point was encountered within 100 scans after the leading edge of the document 14 was detected means that there is no dog ear, like 130, on the document 14.

If the count on the counter 148, shown in FIG. 12, (which count is the coarse dog ear mismatch count) exceeds the predetermined count of six in the embodiment described, it means that the coarse detection trip point 140 has been encountered or detected at step 150.

Because the count on the counter 152 reflects the number of scans from the detection of the leading edge of the document 14, the DSP 62 can determine the location of the coarse detection trip point 140 relative to the leading edge of the document 14. From step 150, the process 144 initiates (at step 162) a fine dog ear detection process 164 shown in FIG. 13.

The fine dog ear detection process 164 (FIG. 13) is generally similar to the the coarse dog ear detection process 146 already discussed in relation to FIG. 12. The leading edge detection process shown in block 166 relates to determining when the Delta value 6 (FIG. 8) for an individual pixel in the scanning line 16 exceeds the AC noise for that pixel as previously discussed. A counter 168 is used to record the number of times that the Delta value 96 exceeds the AC noise for the associated pixel from the reference scan 90. In the embodiment described, the predetermined count on the counter 168 is three, although this value will change for different applications.

Continuing with a discussion of the fine dog ear detection process 164, if the count on the counter 68 is not exceeded, as determined at step 170, the process 164 proceeds to step 172 where a counter 174 is incremented to give an indication of the number of scans from the detection of the coarse detection trip point 140 (FIG. 10). Generally, the fine detection trip point 142 (FIG. 10) is found prior to eight scans being examined after the the coarse trip point 140 is found. This is, because in the embodiment described, the dog ear mark A—A has a width of one mm which is equivalent to eight pixels. Accordingly, if the fine detection trip point 142 is not found within 8 scans of the coarse detection trip point 140 as indicated at the step 176, the process 164 comes to a stop 178. The 8 scans mentioned are reported to the DSP 62 which uses this fact as an indication of the width of the dog ear 130. When the count on the counter 168 exceeds the predetermined amount for this counter, as determined at step 170, the process 164 comes to a halt at stop 180 because the fine detection trip point 142 has been found. The count on the counter 174 provides an indication of the number of scans between the detection of the coarse and fine detection trip points 140 and 142, respectively.

Figure 11:
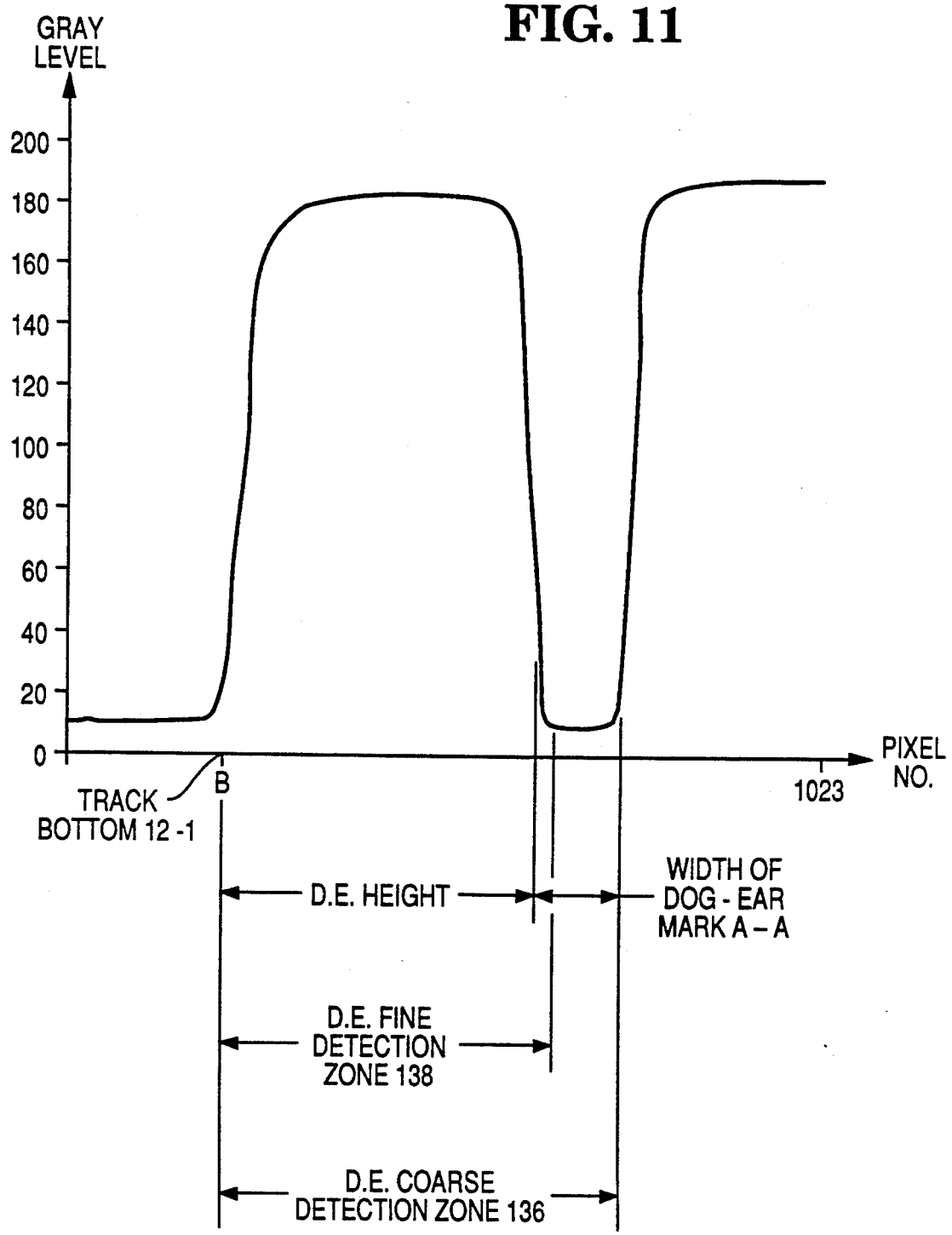
FIG. 11 is a diagram showing a waveshape of a scan of pixels near the bottom of the document shown in FIG. 1.

Another feature of this invention is that the angle of the dog ear 130 (as shown by double arrow 182 in FIG. 10) can be determined from the geometry of the reference member 20 already discussed in relation to FIG. 10 and other elements to be discussed. In this regard, the width of the dog ear mark A—A is known, the number of scans between the coarse and fine detection trip points 140 and 142 is known, and the distance between successive scans is also known. Through conventional trigonometry, the angle of the dog ear 130 (shown by arrow 182) may be determined. Knowing the angle of the dog ear 130 gives a measure of how much of the corner of the document 14 is folded over. To maximize the accuracy of calculating angle 182, a second dog ear mark (not shown), but like A—A, may be positioned at a known distance below the one marked as A—A (FIG. 10) to provide another set of coarse and fine trip points. The resulting X and Y measurements between two such sets of trip points will produce a more accurate calculation of angle 182 using conventional trigonometry. When a dog ear 130 is detected, the DSP 62 sends a message to the PC 46 for the necessary corrective action as discussed earlier herein. The various coarse and fine detection zones 136 and 138 are shown in FIG. 11 which shows the waveshapes near the bottom of the document 14 and the track bottom 12-1. When the fine detection trip point 142 is detected, the number of scans between it and the leading edge of the document 14 detected is used as a measure the width of the dog ear, like 130 (FIG. 10).

Another feature of this invention is that the height of the document 14 is detected without using external sensors, as discussed in relation to detecting the leading and trailing edges of the document 14, for example. As stated earlier herein, the terminal 10 is designed to process a plurality of documents having varying heights. It is therefore useful to know the height of the particular document 14 being processed so that the DSP 62 will not have to process unnecessary data (that appearing above the top of a document) when the system (shown in FIG. 3) performs such tasks as data compression, decompression, and the displaying of images, for example.

The DSP 62 detects the height of the document 14 by finding the top of the document in the image scan data. The document height is then determined by subtracting the position of the track bottom 12-1 (FIG. 5) from the document top position. The DSP 62 relies on the reference member 20 in finding the top of the document 14.

The various physical dimensions of the expected documents relative to the reference member 20 are shown in FIG. 5. As stated previously, the maximum image height expected is 4.2 inches in the embodiment described. Naturally, the principles of this invention may be applied to a range of documents which vary from the dimensions shown in FIG. 5. The DSP 62 starts to process data relative to finding the top of the image data one inch from the leading edge of the document 14 after the leading edge is found, as discussed earlier herein in relation to FIG. 5. This is done to avoid overloading the DSP 62 at a time when it is busy with detecting dog ear functions in a zone which is 0.5 inch from the leading edge of document as discussed earlier herein.

Figure 14:
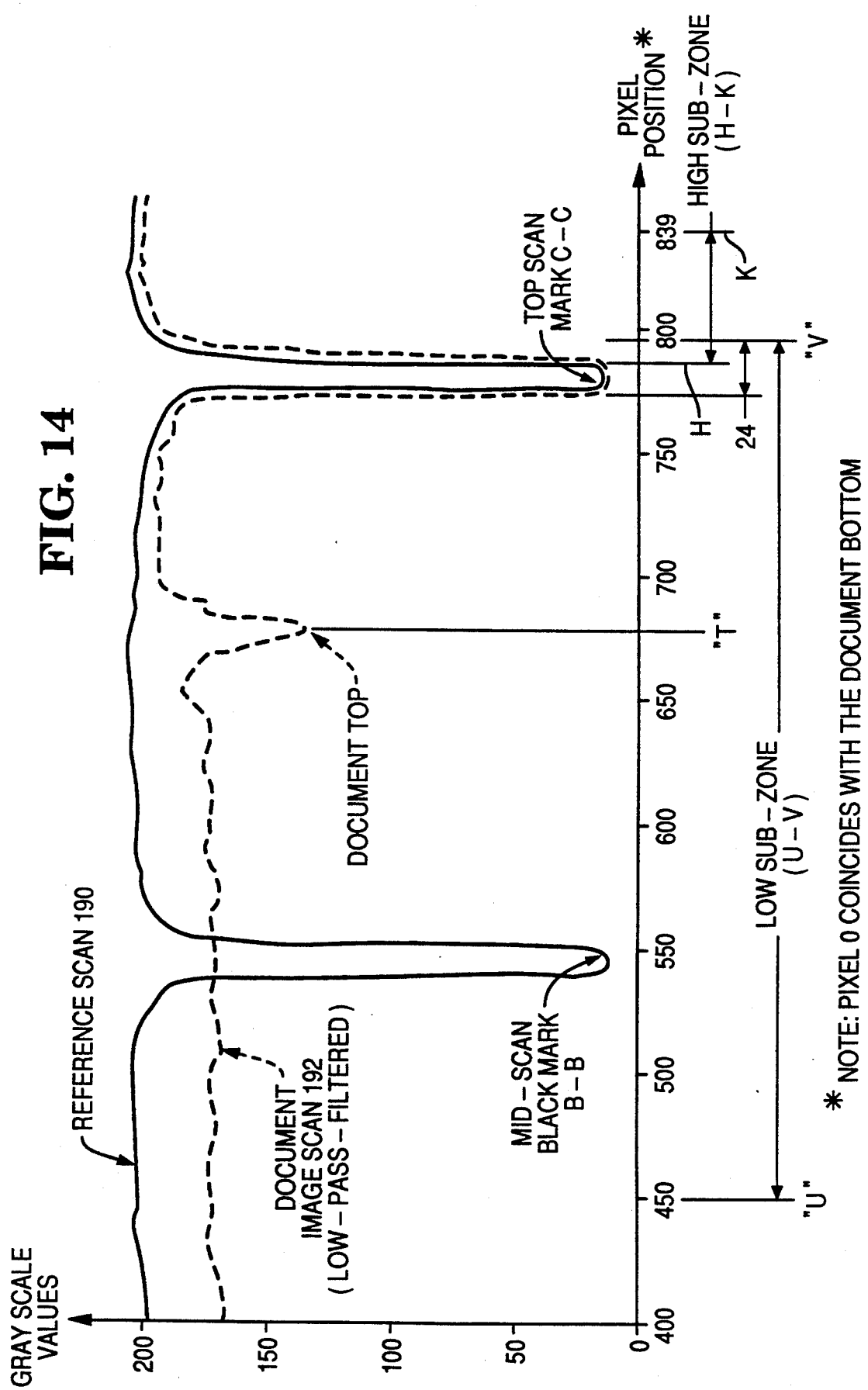

To maximize the reliability of detecting the document height, especially in the case of detecting documents which are "tall", the DSP 62 divides the document height detection zone into two unequal sub-zones around the top scan mark C—C shown in FIGS. 5 and 14. The high sub-zone is located between H and K shown in FIG. 14, and correspondingly, the low sub-zone is shown between U and V.

The DSP 62 decides which of the sub-zones to use for document height detection. If the top-scan mark C—C is covered, the DSP 62 uses the sub-zone H-K (FIG. 14); if the top-scan C—C is not covered, the DSP 62 uses the sub-zone U-V; there is a slight amount of overlap in these two zones. By restricting the image data processing area to the appropriate sub-zone, the chances of making a bad or an incorrect detection of the document height are minimized. A bad detection is one in which the detected document height is less than the actual height of the document; this means that important image data may not be utilized.

After the DSP 62 determines which of the two sub-zones H-K or U-V (FIG. 14) to use, the DSP 62 searches for the top of the document from the top of the sub-zone towards the bottom of the sub-zone. For example, the searching progresses from K to H or from V to U. The same processing steps are used by the controller 62 when the processor 62 works with both of the zones mentioned to find the top edge of the document. Accordingly, only the processing steps related to sub-zone V-U will be described hereinafter.

To look for the top of the document 14 in the lower range for V-U as shown in FIG. 14, the DSP 62 starts to search at point "V" (FIG. 14) which is at a level of about the 800th pixel position in the embodiment described, and searches down to about point "U" which is at a level of about the 450th pixel position. While the scanning from the imaging camera 24 in FIG. 1 is done from the bottom of the document 14 to the top thereof, the searching for the top of the document is done from the top thereof towards the bottom. The DSP 62 has a VRAM 184, a DRAM 186, and an associated data buffer controller 188 (FIG. 6) to perform the necessary data manipulations.

FIG. 14 shows a reference scan 190 and a document image scan 192 as they relate to determining the height of a document 14. The mid-scan mark B—B and the top-scan mark C—C are shown as they relate to the reference member 20. Between the points V and U, the DSP 62 performs low pass filtering to remove high frequency noise from the scan 192. The low pass filtering amounts to taking a running average of the past 16 scans of pixel image data. In other words, there are 16 pixels for each row position which make up the running average for each pixel position.

Notice from FIG. 14 that the image scan 192 is very close to the reference scan 190 from the area of point V to the area of point "T" which represents the top of the document 14. In this V to T area, the filtered pixel in the document image scan 192 differs from the reference scan 190 by a small amount. At or near the area "T", the difference from the reference scan 190 can be as much as or larger than the document height detection noise margin. The sudden discontinuity or dip in the image scan 192 at the point T in FIG. 14 indicates the top of the image data associated with the top of the document 14. There is a certain shadow which exists between the top of the document 14 and the reference member 20. The dark shadow appears in the area T in FIG. 14. When proceeding from point T to the left (as viewed in FIG. 14), the image scan 192 remains significantly different from the reference scan 190. The DSP 62 is programmed to detect point T at which two consecutive filtered pixels exceed the corresponding reference pixels (located on reference scan 190) by more than the detection noise margin. Any high frequency noise which may have occurred in the system would have been filtered by the low pass filtering process mentioned.

After finding the top of the document 14 as described, the DSP 62 operates in a re-checking mode until the trailing edge of the document 14 is encountered. This is done to make sure that no image data associated with the document 14 exists above the alleged top of the document which was found. This re-checking mode increases the reliability of the height detection process, and it also provides the DSP 62 with the ability to track the top of the document 14. This is especially useful for determining the proper document height when the document 14 is skewed relative to the bottom 12-1 of the document track 12. A document 14 is skewed when its bottom is not parallel to the bottom 12-1 of the document track 12. By re-checking, the DSP 62 avoids reporting an incorrect or low document height whereby some important image data might be lost.

The re-checking mode works essentially the same way as does the procedure for determining the top of the document 14 using the sub-zones H-K or U-V already described relative to FIG. 14. The re-checking mode differs in the detection zone used. For the re-checking mode, the DSP 62 establishes a new detection zone which is 50 scans wide and 12 pixels above the alleged top of the document which was established by the first pass by the DSP 62. To repeat, the document "top" is determined by detecting differences between the low-pass filtered image scan 192 (FIG. 14) and the reference scan 192, with the differences being larger than the AC noise margin allowed. When a new document top is found, the DSP 62 uses this new top to establish the new or revised checking zone. The DSP 62 then repeats the height detection process until the trailing edge of the document 14 is encountered.

The document height as mentioned in the previous paragraph is calculated by the following equation:

Document Height = Document Top Position − Track Bottom Position.

When looking at FIG. 5, if the measured document height is between the minimum document height of 2.5 inches and the detection zone bottom 12-1 (2.25 inches), the DSP 62 will report the document height as 2.5 inches, yielding a possible error height of up to 11%. As previously stated, if the DSP 62 fails to find the top of the document 14, it will report a maximum height of 4.2 inches.

The method used to determine the height detection noise margin is somewhat empirical. This is so because it is difficult to measure the AC noise level accurately. For the running average filtering mentioned, the associated stopband amplitude is considered about 0.2 of the low-frequency signal. Using this theoretical principle, the height detection noise margin is generally set to:

0.375 * (estimated maximum AC noise) = 0.375 * (2 * measured AC noise).

Typically, the document height detection noise margin, in the embodiment described, is set to 12 which has proven adequate to provide reliable detection of the height of the document 14. The height detection error is expected to be between 0 and +5%. Note that the error has a small positive value so that no document image data would be lost from the captured image.

Some additional comments appear appropriate for the circuitry 78 shown in FIG. 6. The VRAM 184 is essentially a RAM which has two ports. The VRAM 184 has a serial input port for receiving the image data from the imaging camera 24, and it has an output port for outputting the data in parallel to the data control buffer 188 and the DSP 62. In the embodiment described, the gray scale values from the imaging camera 24 are 7 bits per pixel, with a filler bit making up an 8 bit byte. The VRAM 184 has 256 input registers for holding 256 pixels from the imaging camera 24, and it has an internal memory of 64K bytes for storing 64 scans of data, with each scan of data being 1024 bytes long. When 256 pixels or 8 bit bytes are loaded serially into the VRAM 184, a control signal from the camera control interface 82 is used to indicate to the DSP 62 that 256 pixels have been scanned. The 256 pixels mentioned can be moved to wherever the DSP 62 wants them to be transferred. The DRAM 186 is used for storing processed image data such as bi-level image data converted form the gray scale image data taken from the VRAM 184. The DRAM 186 is also used to store the reference scan 190 mentioned earlier herein.

What is claimed is:

1. In an imaging system which uses an imaging camera to generate successive scans of pixels about a document having a leading edge, a trailing edge, a bottom edge, and a top edge, with said document being moved on said bottom edge past a scanning line in said imaging system, a method of processing said successive scans of pixels from said scanning line comprising the steps of:
   (a) positioning a reference member at said scanning line in said system; and
   (b) using said successive scans of pixels from said imaging camera relative to said reference member and said document to function both as image data about said document and as sensor data for determining the locations in said image data of said leading, trailing, and top edges of said document.

2. The method as claimed in claim 1 in which said reference member has first, second, and third stripes thereon, and in which said using step (b) comprises the step of:
   (b-1) using said successive scans of pixels and said first stripe for determining from said image data whether or not said document has a folded over portion near said leading and bottom edges of said document.

3. The method as claimed in claim 1 in which said reference member has first, second, and third stripes thereon, and in which said using step (b) comprises the step of:
   (b-1) using said successive scans of pixels and said third stripe for determining the location of said top edge of said document.

4. In an imaging system which generates image data from scanning a document, with the image data being presented in successive scans of pixels, a machine implemented method of detecting a predetermined edge of the pixels associated with the document while using only the output of an imaging camera, said method comprising the steps of:
   (a) using the imaging camera to obtain a reference scan pattern of pixels from a reference member positioned at a scanning line in the imaging system when no document is positioned at the scanning line;
   (b) examining successive scans of pixels from said imaging camera as the document is moved towards said scanning line to find a change in the reference scan pattern of pixels; and
   (c) using the change in the reference scan pattern of pixels as the means of detecting the predetermined edge of the pixels associated with the document.

5. The method as claimed in claim 4 in which said using step (c) for detecting said predetermined edge is effective for detecting the leading edge of the pixels associated with the document.

6. In an imaging system which generates image data from scanning a document having a leading edge, a trailing edge, a top edge, and a bottom edge, with the image data being presented in successive scans of pixels, a machine implemented method of locating the successive scans of pixels associated with the document while using only the output of an imaging camera, said method comprising the steps of:
   (a) using the imaging camera to obtain a reference scan pattern of pixels from a reference member positioned at a scanning line in the imaging system when no document is positioned at the scanning line;

(b) examining successive scans of pixels from said imaging camera as the document is moved towards said scanning line to find a change in the reference scan pattern of pixels;

(c) using the change in the reference scan pattern of pixels as the means of detecting the leading edge of the scans of pixels associated with the document; and (d) using a return to the reference scan pattern of pixels as the means of detecting the trailing edge of the scans of pixels associated with the document.

7. The method as claimed in claim 6 in which said reference member has first, second, and third stripes thereon, and in which said method includes the step of:

(e) using said successive scans of pixels and said first stripe for determining whether or not said document has a folded over portion near said leading and bottom edges of said document.

8. The method as claimed in claim 7 in which said using step (e) comprises the steps of:

(e-1) determining a first detection trip point relative to one side of said first stripe;

(e-2) determining a second point relative to an opposite side of said first stripe; and (e-3) using said first and second detection trip points to determine an angle which the folded over portion makes with said bottom edge of said document.

9. The method as claimed in claim 6 in which said reference member has first, second, and third stripes thereon, and in which said method includes the step of:

(e) using said successive scans of pixels and said third stripe for determining the location of the top edge of the document.

10. The method as claimed in claim 9 in which said using step (e) is initiated after a predetermined number of successive scans after the leading edge of the scans of pixels associated with the document has been detected.

11. A method of detecting where useful image data about a document exists within a stream of successive scans of image data coming from an imaging camera positioned at a scanning line, said method comprising the steps of:

(a) positioning a reference member at the scanning line so that the camera outputs successive scans of image data from the reference member when no document covers the reference member and from the document when the document covers the reference member as the document is moved in a document path past the scanning line;

(b) obtaining a reference scan pattern of image data from said reference member when no document is present at the scanning line;

(c) examining said successive scans of image data from said camera while looking for a disturbance in said reference scan pattern of image data to indicate the leading edge of useful image data associated with the document; and (d) utilizing the scans of image data subsequent to the disturbance in said reference scan pattern of image data as being useful image data associated with said document; and (e) also examining said successive scans of image data from the utilizing step (d) while looking for a return to said reference scan pattern of image data to indicate the trailing edge of said document and the end of the useful image data associated with the document.

12. In an imaging system which generates image data from scanning a document having a leading edge, a trailing edge, a bottom edge, and a top edge, with the image data being presented in successive scans of pixels, a machine implemented method of detecting the leading, trailing, and top edges of said document predetermined edge of the pixels associated with the document while using only the output of an imaging camera, said method comprising the steps of:

(a) using the imaging camera to obtain a reference scan pattern of pixels from a reference member positioned at a scanning line in the imaging system when no document is positioned at the scanning line;

(b) examining successive scans of pixels from said imaging camera as the document is moved on said bottom edge towards said scanning line to find a change in the reference scan pattern of pixels; and (c) using the change in the reference scan pattern of pixels as the means of detecting the leading edge, top edge, bottom edge and trailing edge of the pixels associated with the document.

13. In an imaging system which uses an imaging camera to generate successive scans of pixels about a document having a leading edge, a trailing edge, a bottom edge, and a top edge, with said document being moved on said bottom edge in a document track past a scanning line in said imaging system, and with said track having a dark side which covers a portion of the document near the bottom thereof, a method of processing said successive scans of pixels from said scanning line comprising the steps of:

(a) positioning a reference member at said scanning line in said system; and (b) using said successive scans of pixels from said imaging camera relative to said reference member and said document to function both as image data about said document and as sensor data for determining the locations in said image data of said leading, trailing, top, and bottom edges of said document.

14. The method as claimed in claim 13 in which said reference member has a white background with first, second, and third black stripes thereon, and in which said using step (b) comprises the step of:

(b-1) using said successive scans of pixels and said first black stripe for determining from said image data whether or not said document has a folded over portion near said leading and bottom edges of said document.

15. The method as claimed in claim 13 in which said reference member has a white background with first, second, and third black stripes thereon, and in which said using step (b) comprises the step of:

(b-1) using said successive scans of pixels and said third black stripe for determining the location of said top edge of said document.

16. The method as claimed in claim 15 in which said using step (b) comprises the steps of:

(b-1) determining a first detection trip point relative to one side of said first black stripe;

(b-2) determining a second detection trip point relative to an opposite side of said first black stripe; and (b-3) using said first and second detection trip points to determine an angle which the folded over portion makes with said bottom edge of said document.

17. The method as claimed in claim 16 in which said using step (b) is initiated after a predetermined number of successive scans after the leading edge of the scans of pixels associated with the document has been detected.

18. The method as claimed in claim 15 in which said using step (b) also comprises the step of:
   (b-2) using a rapid roll off in white image data coming from said successive scans of pixels coming from the reference member near the dark side of the document track, with this rapid roll off in white image data being used to locate the bottom edge of pixels associated with the bottom edge of the document.

19. The method as claimed in claim 13 in which said using step (b) includes the steps of:
   (b-1) compensating said successive scans of pixels for DC scan noise; and
   (b-2) compensating said successive scans of pixels for AC pixel noise.

20. A reference member for use with an imaging system to facilitate the location of useful image data associated with a document when the document is moved past a scanning line where the reference member is positioned and where an imaging camera is directed to generate said image data by generating successive scan lines of pixels of the reference member when no document is present at the scanning line and to generate successive scan lines of pixels of the document when the document is moved past the scanning line, said reference member comprising:
   a member having a length which is related to the height of the documents anticipated by the associated imaging system; and
   first, second, and third stripes positioned on said member along the length thereof;
   said first stripe being located on said member where fold over portions near the leading and bottom edges of documents anticipated by the associated imaging system may be found;
   said third stripe being located on said member where the top edges of documents anticipated by the associated imaging system may be found; and
   said second stripe being located on said member between said first and third stripes.

21. The reference member as claimed in claim 20 in which said second stripe is spaced equidistantly from said first and third stripes.

22. An imaging system comprising:
   an imaging station having a scanning line thereat;
   a reference member positioned at said scanning line;
   document transport means for moving a document to be imaged to said imaging station;
   an imaging means, including an imaging camera, for generating successive scan lines of pixels about said reference member when no document is present at said scanning line and for generating successive scan lines of pixels about said document when said document is moved past said scanning line in operative relationship with said imaging camera; and
   processing means for using said successive scans of pixels from said imaging camera relative to said reference member and relative to said document to function both as image data about said document and as sensor data for determining the locations of the leading, trailing, and top edges of the document in said image data.

23. The imaging system as claimed in claim 22 in which said reference member has first, second, and third stripes thereon, and in which said processing means has first detect means for detecting the leading and trailing edges of said document in said image data while using the successive scans of pixels associated with said reference member.

24. The imaging system as claimed in claim 23 in which said processing means has second detect means for detecting from said image data whether or not said document has a folded over portion near the leading and bottom edges of said document.

25. The imaging system as claimed in claim 24 in which said processing means has third detect means for detecting from said image data the top edge of said document.

26. The imaging system as claimed in claim 25 in which said processing means has a fourth detect means for detecting the bottom edge of the document.

* * * * *

UNITED STATES PATENT AND TRADEMARK OFFICE
CERTIFICATE OF CORRECTION

PATENT NO. : 5,323,473
DATED : June 21, 1994
INVENTOR(S) : Simon Lau

It is certified that error appears in the above-indentified patent and that said Letters Patent is hereby corrected as shown below:

Column 19, line 25, after "second" insert --detection trip--.

Signed and Sealed this

Twenty-first Day of March, 1995

Attest:

BRUCE LEHMAN

Attesting Officer    Commissioner of Patents and Trademarks